United States Patent
Brahms et al.

(10) Patent No.: US 7,756,930 B2
(45) Date of Patent: Jul. 13, 2010

(54) TECHNIQUES FOR DETERMINING THE REPUTATION OF A MESSAGE SENDER

(75) Inventors: Robert Brahms, San Francisco, CA (US); Daniel Quinlan, San Jose, CA (US); Craig Sprosts, San Francisco, CA (US)

(73) Assignee: IronPort Systems, Inc., San Bruno, CA (US)

( * ) Notice: Subject to any disclaimer, the term of this patent is extended or adjusted under 35 U.S.C. 154(b) by 939 days.

(21) Appl. No.: 10/857,641

(22) Filed: May 28, 2004

(65) Prior Publication Data

US 2006/0031314 A1    Feb. 9, 2006

(51) Int. Cl.
*G06F 15/16* (2006.01)
(52) U.S. Cl. .................................................. 709/206
(58) Field of Classification Search ............... 709/206, 709/225; 715/752
See application file for complete search history.

(56) References Cited

U.S. PATENT DOCUMENTS

| | | | |
|---|---|---|---|
| 4,956,769 A | 9/1990 | Smith | |
| 5,319,776 A | 6/1994 | Hile et al. | |
| 5,623,600 A | 4/1997 | Ji et al. | |
| 5,802,178 A | 9/1998 | Holden et al. | |
| 5,805,810 A | 9/1998 | Maxwell | |
| 5,832,208 A | 11/1998 | Chen et al. | |
| 5,889,943 A | 3/1999 | Ji et al. | |
| 5,915,087 A | 6/1999 | Hammond et al. | |
| 5,933,416 A | 8/1999 | Schenkel et al. | |
| 5,958,005 A | 9/1999 | Thorne et al. | |
| 5,966,685 A | 10/1999 | Flanagan et al. | |
| 5,968,176 A | 10/1999 | Nessett et al. | |
| 5,970,149 A | 10/1999 | Johnson | |
| 5,983,270 A | 11/1999 | Abraham et al. | |
| 5,983,350 A | 11/1999 | Minear et al. | |
| 5,999,967 A | 12/1999 | Sundsted | |
| 6,003,084 A | 12/1999 | Green et al. | |
| 6,006,329 A | 12/1999 | Chi | |

(Continued)

FOREIGN PATENT DOCUMENTS

EP    1509014 A2    2/2005

(Continued)

OTHER PUBLICATIONS

Cynthia Dwork, et al., "Pricing via Processing or Combatting Junk Mail," Draft of full version, preliminary version of this paper was presented at Crypto '92, pp. 1-11.

(Continued)

*Primary Examiner*—Benjamin R Bruckart
*Assistant Examiner*—Benjamin Ailes
(74) *Attorney, Agent, or Firm*—Hickman Palermo Truong & Becker LLP

(57) ABSTRACT

Techniques are provided for determining a reputation of a message sender by obtaining two or more lists from two or more list providers; determining which lists of the two or more lists indicate the message sender; and determining a reputation score for the message sender based on which lists of the two or more lists indicate the message sender. Techniques are also provided for indicating that a message is unsolicited based on a reputation score.

112 Claims, 8 Drawing Sheets

U.S. PATENT DOCUMENTS

| | | | |
|---|---|---|---|
| 6,052,709 A | 4/2000 | Paul | |
| 6,072,942 A | 6/2000 | Stockwell et al. | |
| 6,073,142 A | 6/2000 | Geiger et al. | |
| 6,073,165 A | 6/2000 | Narasimhan et al. | |
| 6,131,110 A | 10/2000 | Bates et al. | |
| 6,161,130 A | 12/2000 | Horvitz et al. | |
| 6,161,185 A | 12/2000 | Guthrie et al. | |
| 6,192,114 B1 | 2/2001 | Council | |
| 6,195,587 B1 | 2/2001 | Hruska et al. | |
| 6,212,558 B1 | 4/2001 | Antur et al. | |
| 6,226,670 B1 | 5/2001 | Ueno et al. | |
| 6,233,618 B1 | 5/2001 | Shannon | |
| 6,266,664 B1 | 7/2001 | Russell-Falla et al. | |
| 6,266,692 B1 | 7/2001 | Greenstein | |
| 6,289,105 B1 | 9/2001 | Murota | |
| 6,330,590 B1 | 12/2001 | Cotten | |
| 6,334,193 B1 | 12/2001 | Buzsaki | |
| 6,341,309 B1 | 1/2002 | Vaid et al. | |
| 6,393,568 B1 | 5/2002 | Ranger et al. | |
| 6,408,336 B1 | 6/2002 | Schneider et al. | |
| 6,415,313 B1 | 7/2002 | Yamada et al. | |
| 6,421,709 B1 | 7/2002 | McCormick et al. | |
| 6,434,600 B2 | 8/2002 | Waite et al. | |
| 6,453,327 B1 | 9/2002 | Nielson | |
| 6,460,050 B1 | 10/2002 | Pace et al. | |
| 6,484,261 B1 | 11/2002 | Wiegel | |
| 6,502,131 B1 | 12/2002 | Vaid et al. | |
| 6,507,866 B1 | 1/2003 | Barchi | |
| 6,539,430 B1 | 3/2003 | Humes | |
| 6,546,416 B1 | 4/2003 | Kirsch | |
| 6,587,550 B2 | 7/2003 | Council et al. | |
| 6,591,291 B1 | 7/2003 | Gabber et al. | |
| 6,609,196 B1 | 8/2003 | Dickinson, III et al. | |
| 6,650,890 B1 | 11/2003 | Irlam et al. | |
| 6,654,787 B1 | 11/2003 | Aronson et al. | |
| 6,675,162 B1 | 1/2004 | Russell-Falla et al. | |
| 6,701,440 B1 | 3/2004 | Kim et al. | |
| 6,708,205 B2 * | 3/2004 | Sheldon et al. | 709/206 |
| 6,732,157 B1 | 5/2004 | Gordon et al. | |
| 6,748,422 B2 * | 6/2004 | Morin et al. | 709/206 |
| 6,785,732 B1 | 8/2004 | Bates et al. | |
| 6,886,099 B1 | 4/2005 | Smithson et al. | |
| 6,894,981 B1 | 5/2005 | Coile et al. | |
| 6,941,348 B2 | 9/2005 | Petry et al. | |
| 7,072,942 B1 | 7/2006 | Maller | |
| 7,149,778 B1 * | 12/2006 | Patel et al. | 709/206 |
| 7,171,450 B2 * | 1/2007 | Wallace et al. | 709/206 |
| 7,181,498 B2 * | 2/2007 | Zhu et al. | 709/206 |
| 7,184,971 B1 | 2/2007 | Ferber | |
| 7,206,814 B2 * | 4/2007 | Kirsch | 709/206 |
| 7,219,148 B2 | 5/2007 | Rounthwaite et al. | |
| 7,272,853 B2 | 9/2007 | Goodman et al. | |
| 7,331,061 B1 | 2/2008 | Ramsey et al. | |
| 7,342,906 B1 | 3/2008 | Calhoun | |
| 7,366,761 B2 * | 4/2008 | Murray et al. | 709/206 |
| 7,409,708 B2 | 8/2008 | Goodman et al. | |
| 7,475,118 B2 | 1/2009 | Leiba et al. | |
| 7,490,128 B1 | 2/2009 | White et al. | |
| 7,523,168 B2 * | 4/2009 | Chadwick et al. | 709/206 |
| 7,627,670 B2 * | 12/2009 | Haverkos | 709/224 |
| 2001/0005885 A1 | 6/2001 | Elgamal et al. | |
| 2001/0039593 A1 | 11/2001 | Hariu | |
| 2002/0004908 A1 | 1/2002 | Galea | |
| 2002/0016824 A1 | 2/2002 | Leeds | |
| 2002/0023135 A1 * | 2/2002 | Shuster | 709/206 |
| 2002/0059385 A1 * | 5/2002 | Lin | 709/206 |
| 2002/0073240 A1 | 6/2002 | Kokkinen et al. | |
| 2002/0116463 A1 * | 8/2002 | Hart | 709/206 |
| 2002/0120600 A1 | 8/2002 | Schiavone et al. | |
| 2002/0133469 A1 | 9/2002 | Patton | |
| 2002/0143888 A1 | 10/2002 | Lisiecki et al. | |
| 2002/0184315 A1 | 12/2002 | Earnest | |
| 2002/0184533 A1 | 12/2002 | Fox | |
| 2002/0198950 A1 * | 12/2002 | Leeds | 709/206 |
| 2002/0199095 A1 | 12/2002 | Bandini et al. | |
| 2003/0023875 A1 | 1/2003 | Hursey et al. | |
| 2003/0050988 A1 | 3/2003 | Kucherawy | |
| 2003/0069935 A1 * | 4/2003 | Hasegawa | 709/206 |
| 2003/0079142 A1 | 4/2003 | Margalit et al. | |
| 2003/0093689 A1 | 5/2003 | Elzam et al. | |
| 2003/0097591 A1 | 5/2003 | Pham et al. | |
| 2003/0110224 A1 | 6/2003 | Cazier et al. | |
| 2003/0115485 A1 | 6/2003 | Milliken | |
| 2003/0149726 A1 | 8/2003 | Spear | |
| 2003/0158905 A1 | 8/2003 | Petry et al. | |
| 2003/0167402 A1 | 9/2003 | Stolfo et al. | |
| 2003/0172050 A1 | 9/2003 | Decime et al. | |
| 2003/0172291 A1 | 9/2003 | Judge et al. | |
| 2003/0185391 A1 | 10/2003 | Qi et al. | |
| 2003/0191969 A1 | 10/2003 | Katsikas | |
| 2003/0208562 A1 | 11/2003 | Hauck et al. | |
| 2003/0212791 A1 * | 11/2003 | Pickup | 709/225 |
| 2003/0225850 A1 | 12/2003 | Teague | |
| 2003/0233418 A1 | 12/2003 | Goldman | |
| 2004/0003255 A1 | 1/2004 | Apvrille et al. | |
| 2004/0006747 A1 | 1/2004 | Tyler | |
| 2004/0019651 A1 * | 1/2004 | Andaker | 709/207 |
| 2004/0024632 A1 | 2/2004 | Perry | |
| 2004/0054742 A1 | 3/2004 | Gruper et al. | |
| 2004/0058673 A1 | 3/2004 | Irlam et al. | |
| 2004/0064371 A1 | 4/2004 | Crapo | |
| 2004/0068542 A1 | 4/2004 | Lalonde et al. | |
| 2004/0073617 A1 | 4/2004 | Milliken et al. | |
| 2004/0083230 A1 | 4/2004 | Caughey | |
| 2004/0083408 A1 | 4/2004 | Spiegel et al. | |
| 2004/0093384 A1 | 5/2004 | Shipp | |
| 2004/0111381 A1 | 6/2004 | Messer et al. | |
| 2004/0117648 A1 | 6/2004 | Kissel | |
| 2004/0139165 A1 * | 7/2004 | McMillan et al. | 709/206 |
| 2004/0139314 A1 | 7/2004 | Cook et al. | |
| 2004/0167964 A1 * | 8/2004 | Rounthwaite et al. | 709/206 |
| 2004/0167968 A1 | 8/2004 | Wilson et al. | |
| 2004/0177110 A1 | 9/2004 | Rounthwaite et al. | |
| 2004/0177120 A1 | 9/2004 | Kirsch | |
| 2004/0181581 A1 * | 9/2004 | Kosco | 709/206 |
| 2004/0186891 A1 | 9/2004 | Panec et al. | |
| 2004/0215977 A1 | 10/2004 | Goodman et al. | |
| 2004/0250127 A1 | 12/2004 | Scoredos et al. | |
| 2004/0254990 A1 * | 12/2004 | Mittal | 709/206 |
| 2004/0260922 A1 | 12/2004 | Goodman et al. | |
| 2005/0005107 A1 | 1/2005 | Touboul | |
| 2005/0060643 A1 | 3/2005 | Glass et al. | |
| 2005/0064850 A1 | 3/2005 | Irlam et al. | |
| 2005/0071432 A1 | 3/2005 | Royston et al. | |
| 2005/0071485 A1 | 3/2005 | Ramagopal | |
| 2005/0080855 A1 * | 4/2005 | Murray | 709/206 |
| 2005/0080856 A1 | 4/2005 | Kirsch | |
| 2005/0080857 A1 | 4/2005 | Kirsch et al. | |
| 2005/0091319 A1 | 4/2005 | Kirsch | |
| 2005/0108518 A1 | 5/2005 | Pandya | |
| 2005/0182959 A1 | 8/2005 | Petry et al. | |
| 2005/0193076 A1 | 9/2005 | Flury et al. | |
| 2005/0193429 A1 | 9/2005 | Demopoulos et al. | |
| 2005/0198518 A1 | 9/2005 | Kogan et al. | |
| 2005/0203994 A1 | 9/2005 | Palmer et al. | |
| 2005/0204005 A1 * | 9/2005 | Purcell et al. | 709/206 |
| 2005/0246440 A1 | 11/2005 | Yu | |
| 2005/0283837 A1 | 12/2005 | Olivier et al. | |
| 2006/0031306 A1 * | 2/2006 | Haverkos | 709/206 |
| 2006/0095410 A1 | 5/2006 | Ostrover et al. | |
| 2006/0161988 A1 | 7/2006 | Costea et al. | |
| 2008/0104186 A1 * | 5/2008 | Wieneke et al. | 709/206 |
| 2008/0104187 A1 * | 5/2008 | Wilson et al. | 709/206 |
| 2008/0256072 A1 * | 10/2008 | Logan et al. | 707/7 |

| | | | |
|---|---|---|---|
| 2008/0270540 | A1* | 10/2008 | Larsen ........................ 709/206 |
| 2009/0019126 | A1* | 1/2009 | Adkins ........................ 709/206 |

FOREIGN PATENT DOCUMENTS

| | | |
|---|---|---|
| WO | WO 01/67330 A1 | 9/2001 |
| WO | WO/ 02/19069 A2 | 3/2002 |
| WO | WO 02/25464 A1 | 3/2002 |
| WO | WO 02/39356 A1 | 5/2002 |
| WO | WO 02/19069 A | 7/2002 |
| WO | WO 2005/081477 A1 | 9/2005 |

OTHER PUBLICATIONS

Declude, "List of All Known DNS-based Spam Databases," Apr. 20, 2004, http://www.declude.com/Articles.asp?ID=97, data retrieved Aug. 19, 2004, pp. 1-15.
International Searching Authority, "Notification of Transmittal of the International Search Report or the Declaration," Jun. 8, 2004, 7 pages.
Current Claims in PCT patent application, International Application No. PCT/US03/37417, 16 pages.
International Searching Authority, "Notification of transmittal of the international search report and the written opinion of the international searching authority, or the declaration," international application No. PCT/US2005/005498, dated May 12, 2005, 12 pages.
Current Claims, PCT/US2005/005498, 14 pages.
International Searching Authority, "Notification of Transmittal of the International Search Report and the Written Opinion of the International Searching Authority, or the Declaration," PCT/US05/19037, 10 pages.
Current Claims, PCT/US05/19037, 12 pages.
International Searching Authority, "Notification of Transmittal of the International Search Report and the Written Opinion of the International Searching Authority, or the Declaration," PCT/US05/19143, Dated Apr. 7, 2006, 8 pages.
Current Claims, PCT/US05/19143, 24 pages.
Patent Cooperation Treaty, "Notification Concerning Transmittal International Preliminary Report on Patentability," PCT/US2005/005498, received Sep. 12, 2006, 7 pages.
Klensin, J., "Simple mail Transfer Protocol," Network Working Group, RFC 2821, dated . Apr. 2001, 79 pages.
International Searching Authority, "Notification of Transmittal of the International Search Report and the Written Opinion of the International Searching Authority, or the Declaration," PCT/US05/18999, Feb. 6, 2007, 8 pages.
Current Claims, PCT/US05/18999, 14 pages.
International Bureau, "International Preliminary Report on Patentability," PCT/US2005/018999, dated Feb. 28, 2007, 5 pages.
Current Claims, PCT/US2005/018999, 14 pages.
European Patent Office, "Communication pursuant to Article 96 (2) EPC", European application No. 05 723 433.8 — 1244, received Aug. 22, 2007, 5 pages.
Claims, European application No. 05 723 433.8 — 1244, 13 pages.
Avery, Mike, "Networking: Product Reviews: MimeSweeper neatly cleans up e-mail Web Content," InfoWorld Jun. 23, 1997, reproduced by High Beam Research LLC., 3 pages. (Reference on CD-ROM).
Cashramspam.com, "CashRamSpam.com," file://C:\DOCUME~1\LOCALS~1\temp\2OJL2VHQ.htm, printed Feb. 19, 2003, 9 pages. (Reference on CD-ROM).
"Check Point Firewalls," [Online], retrieved from the internet URL: <http://www.trellisnet.corn/Security/Checkpoint/firewalls.asp>, Trellis Network Services, Retrieved on May 18, 2004, pp. 1-3. (Reference on CD-ROM).
"Check Point Signs Technology licensing Agreement with RSA Data Security," Check Point Software Technologies LTD., Sep. 18, 1995, 2 pages. (Reference on CD-ROM).
"Check Point Software technologies to Secure Backweb's Internet Broadcasting Software," Check Point Software Technologies Ltd., reproduction of article from Internet World dated Dec. 11, 1996, 2 pp.. (Reference on Cd-Rom).
"Control Data Systems Partners With Check Point Software To Resell FireWall-1," Check Point Software Technologies LTD., Feb. 21, 1996, 2 pages. (Reference on CD-ROM).

International Searching Authority, "Notification of Transmittal of the International Search Report and the Written Opinion of the International Searching Authority, or the Declaration," PCT/US04/00969, Aug. 18, 2004, 10 pages. (Reference on CD-ROM).
Current Claims in PCT patent application, International Application No. PCT/US03/37417, 16 pages. (Reference on CD-ROM).
Current Claims in International Application, application No. PCT/US04/00969, 19 pages. (Reference on CD-ROM).
International Searching Authority, "Notification of Transmittal of the International Search Report or the Declaration," PCT/US03/37417, Jun. 8, 2004, 7 pages. (Reference on CD-ROM).
Declude, "List of All Known DNS-based Spam Databases," Apr. 20, 2004, http://www.declude.com/Articles.asp?ID=97, data retrieved Jun. 27, 2005, pp. 1-21. (Reference on CD-ROM).
Dwork, Cynthia, et al., "Pricing via Processing or Combatting Junk Mail," Draft of full version, preliminary version of this paper was presented at Crypto '92, pp. 1-11. (Reference on CD-ROM).
eSOFT.COM, "InstaGate EX2-the Firewall with a Future," eSoft Incorporated, 2001, 9 pages. (Reference on CD-ROM).
"eTrust Secure Content Manager," Computer Associates International Inc., 2003, pp. 1-7. (Reference on CD-ROM).
"Fighting Fire with Fire," Computer Reseller News, n757, pp. 143-152, Oct. 6, 1997, 14 pages. (Reference on CD-ROM).
"F-Secure Internet Gatekeeper," F-Secure Data Sheet, F-Secure Corporation, 2 pages (Reference on CD-ROM).
Google Groups, "MIME mail bombs," Message 1 thread from Selden E. Ball dated Feb. 28, 1995, 3 pages. (Reference on CD-ROM).
Google Groups, "PMDF and VSWEEP Virus Scanner," Message 1 thread from Eileen Byrne Telecom 617-386-2181, dated Nov. 13, 1995, 2 pages. (Reference on CD-ROM).
Google Groups, "Virus Scanning", Message 1 Thread from John F. Reddington dated Jul. 25, 1995, 5 pages. (Reference on CD-ROM).
Google Groups, "Virus Scanning", Sara.Appleyard, Sep. 8, 1996, 5 pages. (Reference on CD-ROM).
"Integralis Announces MIMEsweeper Compatible with Check Point FireWall-1 on Single NT Server," Checkpoint Software Technologies LTD., Sep. 16, 1996, 2 pages (Reference on CD-ROM).
Kent, Stephen T., "Internet Privacy Enhanced Email," Communications of the ACM, vol. 36, No. 8, Aug. 1993, pp. 48-60. (Reference on CD-ROM).
Lemos, Robert, "Paying Up for a Spam Seal of Approval," Jun. 24, 2002, http://news.com.com/2100-1001-938976.html, printed Feb. 19, 2003, pp. 1-3. (Reference on CD-ROM).
Mason, Justin, "SpamAssasin Prehistory: filter.plx," [Online], [retrieved on Jun. 20, 2005]. Retrieved from the internet:http://spamassasin.apache.org/prehistory/. (Reference on CD-ROM).
Mccullagh, Declan, "Spam Blocker charges for e-mail," CNET Newsc.com, Feb. 19, 2003, Retrieved from <http://www.dotcomeon.com/payformail.htm>, printed Jun. 30, 2005, 2 pages. (Reference on CD-ROM).
MIMEsweeper 2.0 Press' Release, "Integralis releases MIMEsweeper Version 2.0 with SMTP mail security support," [online], Jan. 15, 1996, [retrieved on Jun. 8, 2004]Retrieved from the internet: http://web.archive.org/web/19961112103826/www.nha.com/rel120.htm (Reference on CD-ROM).
MIMEsweeper 2.3 Press Release, "Integralis announces version 2.3 of MIMEsweeper with new email security features," reproduced from Email World, Jun. 13, 1996, 2 pages. (Reference on CD-ROM).
"MIMEsweeper 'Online' SPD," product description for MIMEsweeper [online], [retrieved on Jun. 8, 2004], retrieved from the Internet: http://web.archive.org/web/1996112103244/www.nha.com/msw_onli.htm (Reference on CD-ROM).
"New Product 'E-Mail Virus Wall' protects companies from e-mail-borne viruses, including new macro viruses," Business Wire, p. 02160157, Feb. 16, 1996, 3 pages. (Reference on CD-ROM).
Nicholas, Nick, "Realtime Blackhole List, Spamware Defined," downloaded on May 27, 2004 from <http://mail-abuse.org/rbl/spamware.htm, 2 pages. (Reference on CD-ROM).
Olawsky, Duane et al., "Developing and Using a 'Policy Neutral' Access Control Policy," Secure Computing Corporation, Dec. 2, 1996, pp. 60-67.
Omniva, "Omniva Policy Manager," Technical White Paper, Ominiva Policy Systems, Jan. 2004, pp. 1-23. (Reference on CD-ROM) .

Oppliger, Rolf, "Internet Security; Firewalls and Bey," Communication of the ACM, vol. 40, No. 5, May 1997, pp. 92-102. (Reference on CD-ROM).

Postini Inc., "Postini Perimeter Manager: The Industry's Leading Email Security and Management Solution," Postini Inc., 2004, 4 pages. (Reference on CD-ROM).

"Prevention of Forged-Spam email via Sendmail (Relay Disable)" <http://docsrv.sco.com/MM_admin/mmadminC.spam_forge.html>, Nov. 1999. (Reference on CD-ROM).

"Product Overview—IronMail: The Secure Email Gateway Appliance," CipherTrust, 2 pages. (Reference on CD-ROM).

Prolin, P. et al., "Network Security Probe", Telecom Bretagne, Nov. 1994, pp. 229-240. (Reference on CD-ROM).

"Raptor Systems and Trend Micro to Develop Integrated Firewall/Virus Wall; Security Partnership to Protect Against Unauthorized Access and Viruses," Business Wire, p. 05030072, May 3, 1996, 2 pages. (Reference on CD-ROM).

Rhyolite Software, "Distributed Checksum Clearinghouse," [Online] [Retrieved on Jun. 20, 2005], retrieved from the internet: http://www.rhyolite.com/anti-spam/dcc, pp. 1-5, (Reference on CD-ROM).

Sullivan, Andy "Buffalo Spammer' Sentenced to 3-1/2 to 7 years", U.S. National-Reuters downloaded on May 27, 2004 from <http://news.yahoo.com/news?tmpl=story&u=/nm/20040527/us_nm/tech_spam_dc>, 2 pages_(Reference on CD-ROM).

"Surf Control E-mail Filter," http://www.surfcontrol.com/uploadedfiles/SEF_datasheet.pdf, SurfControl plc., 4 pages. (Reference on CD-ROM).

"Symantic Ships Norton AntiVirus for Internet Email Gateways," PR Newswire, p. 0224SFM068, Feb. 24, 1997, 4 pages. (Reference on CD-ROM).

"The Elm Filter System Guide," CETS Answers, Computing and Educational Technology Services, University of Pennsylvania, Jun. 24, 2003, 8 pages. (Reference on CD-ROM).

"The Elm Filter System Guide, What the Filter Program is, and How to Use It," San Diego State University ROHAN Academic Computing, May 29, 1996, pp. 1-8, available online at http://www-rohan.sdsu.edu/filter.html.

Thorud, G., "Message Handling Systems," Telektronikk, vol. 90, No. 2, 1994, pp. 86-88. (Reference on CD-ROM).

Trend Micro, "Policy-based Antivirus and Content Security for the Messaging Gateway," White Paper, Trend Micro Interscan Messaging Security Suite, Jun. 2002, pp. 1-20. (Reference on CD-ROM).

Trumbo, Jan et al., "Features: Big, Bad E-mail," Network Computing, Oct. 8, 1996, 4 pages, available at <http://www.nwc.corn/716/716f2.html>.

Weisband, Suzanne P. et al., "Managing User Perceptions of Email Privacy," Communications of the ACM, vol. 38, No. 12, Dec. 1995, pp. 40-47. (Reference on CD-ROM).

1997 Press Release, "Trend Micro Sues Integralis for Gateway Anti-VirusPatent Infringement, Seeks to End Sales of E-mail, Internet Gateway product," Trend Micro, Jul. 8, 1997, 2 pages. (Reference on CD-ROM).

Garreston, "IronPort looks to be E-mail's Guardian", Network World, Sep. 2004, 2 pages.

Spam Assassin, "SpamAssassin: Tests Performed", Spam Assassin, Jun. 4, 2003, 51 pages.

Achelis, Steven B., "Technical Analysis from A to Z", Introduction-Moving Averages, Equis International, 2001, 12 pages.

Visualware, "VisualRoute Server", Visualware Inc., Mar. 12, 2001, 4 pages.

Levine, J., "DNS Based Blacklists and Whitelists for E-Mail", Anti-Spam Research Group, IETF: Apr. 26, 2004, 7 pages.

Andrews, M., "RFC 2308: Negative Caching of DNS Queries", IETF: Mar. 1998, 19 pages.

Wong, "Preventing Spams and Relays", Linux, 1998, Dec. 1998, 7 pages.

Spam Assassin, retrieved from http://web.archive.org, retrieved Dec. 2008, 60 pages.

Ironport, "Messaging Gateway Appliances", http://web.archive.org, Dec. 2008, 14 pages.

Microsoft, "Microsoft Computer Dictionary", Fifth Edition, May 2002, 7 pages.

Smith, Roderick, W., "Advanced Linux Networking", Addison Wesley Professional, Jun. 2002, 62 pages.

Wong, J. 1998. Preventing Spams and Relays. Linux J. 1998, 56es (Dec. 1998), 10.

Ironport Messaging Gateway Appliances: http://web.archive.org/web/2000421095627/http://ironport.com/http://web.archive.org/web/20030405102438/www,senderbase.com/http://web.acrchive.org/web/20030724022036/www.ironport.com/pdf/ironport_c60_brochure.pdf.

R. Hiden, ed., Applicability Statement for the Implementation of Classless Inter-Domain Routing (CIDR), RFC 1517, Sep. 1993.

Y. Rekhter & T. Li, eds., An Architectre for IP Address Allocation with CIDR, RFC 1518, Sep. 1993.

Wong, J. 1998. Preventing Spams and Relays. Linux J. 1998, 56es (Dec. 1998), 10.

* cited by examiner

TECHNIQUES FOR DETERMINING THE REPUTATION OF A MESSAGE SENDER

RELATED APPLICATIONS; PRIORITY CLAIM

This is related to U.S. Non-Provisional patent application Ser No. 10/717,441, filed Nov. 18, 2003, naming Banister et al. as inventors, which claims domestic priority under 35 U.S.C. 119 from prior U.S. Provisional Patent application No. 60/428,134, filed Nov. 20, 2002, naming Banister et al. as inventors, and 60/482,883, filed Jun. 25, 2003 naming Banister et al. as inventors, the entire contents of which are hereby incorporated by reference for all purposes as if fully act forth herein.

This application is related to U.S. Provisional patent application No. 60/545,609, filed Feb. 17, 2004, entitled "COLLECTING, AGGREGATING, AND MANAGING INFORMATION RELATING TO ELECTRONIC MESSAGES", naming Flury et al. as inventors, which is hereby incorporated by reference for all purposes as if fully set forth herein.

This application is related to U.S. Provisional patent application No. 60/574,530, filed May 25, 2004, entitled "COLLECTING, AGGREGATING, AND MANAGING INFORMATION RELATING TO ELECTRONIC MESSAGES", naming Flury et al. as inventors, which is hereby incorporated by reference for all purposes as if fully set forth herein.

This application is related to U.S. patent application No. 10/856,693, filed May 28, 2004, entitled "ELECTRONIC MESSAGE DELIVERY WITH ESTIMATION APPROACHE", naming Perry et al. as inventors, which is hereby incorporated by reference for all purposes as if fully set forth herein.

FIELD OF THE INVENTION

The present invention generally relates to electronic message delivery in a networked system. The invention relates more specifically to techniques for determining the reputation of a message sender.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The use of electronic message communication systems has increased significantly in the recent past. However, numerous users of such systems, whether they are message senders or receivers, find such systems inconvenient and cumbersome to use. Similar problems are associated with telephone, facsimile, and e-mail communications, and others.

In the e-mail context, in one past approach, senders marketing commercial products or services would acquire or develop lists of e-mail addresses and then periodically send mass unsolicited e-mail messages ("spam") to all addresses in the lists. Using modern electronic systems, the cost of sending millions of such messages has been negligible, and a response rate of even less than one percent has been considered worthwhile. Thus, successful delivery of unsolicited messages to valid in-boxes of recipients normally translates into income for the sender.

Unfortunately, this approach causes receivers to receive unwanted messages. The direct and indirect costs of receiving "spam" are high. In response, receivers have adopted a variety of approaches to prevent receipt or viewing of unwanted messages.

In one approach, receivers use filtering, marking, or blocking technologies that attempt to classify messages as "spam" or not spam by examining various aspects of the message. For example, some filters look for keywords in the message subject line and reject or quarantine messages that contain keywords matching a list of prohibited words. In another approach, receivers use "blacklists" to identify and prohibit or less easily admit messages from suspect senders of unsolicited messages. Some receivers augment these technologies with personal "white lists" of friends or other acceptable senders; messages from senders in the white list are admitted or more easily admitted. The white lists and blacklists also may come from networked sources. Techniques for performing blacklist lookups are described at the "ip4r" HTML document that is available online at the time of this writing at the "support" subdirectory of the "junkmail" directory of the "declude" commercial domain of the World Wide Web, and at the "bill" section of the "scconsult" commercial domain of the World Wide Web. Example blacklists include the series of blacklists provided by the "njabl" organization domain of the World Wide Web. Example white lists could include lists of Fortune 500 companies and other reputable senders.

One problem with these approaches is that some messages that receivers want may not reach the intended receivers because they are identified as "spam" by the filtering or blocking technologies. Receivers who use filtering or blocking technologies regularly fail to receive some legitimate messages because the filtering and blocking technologies cannot always properly distinguish legitimate messages from unsolicited messages. For example, certain industry-standard terms or technical abbreviations may be identical to prohibited keywords, confusing the "spam" filter.

Further, receivers continue to receive large volumes of unwanted messages that are not properly trapped by the "spam" filter. As a result, many receivers now refuse to disclose their address except under limited circumstances. In response, many legitimate senders, such as reputable commercial enterprises, have developed "opt-in" procedures in which the addresses of receivers, such as customers, are not used at all unless the receiver affirmatively agrees to receive messages. Even when this is done, the filtering or blocking technologies may delete or quarantine even those messages from legitimate senders that are directed to receivers who have "opted in." Consequently, the value of e-mail as a marketing tool for responsible communications directed to receivers who have "opted in" is decreasing. Many receivers remain essentially defenseless to the daily onslaught of "spam" arriving in their e-mail in-boxes. Whereas many states have enacted legislation that imposes civil or criminal penalties for sending "spam," these remedies are time-consuming for receivers to pursue. In addition, while many Internet Service Providers ("ISPs") actively identify and refuse to communicate or do business with those who send "spam," however, policing such improper activity imposes a significant cost on the ISP. In addition, ISPs are burdened with the aggregated network and disk usage costs associated with the sending and receiving the unwanted messages. End users may also be burdened with bandwidth costs associated with downloading these messages.

ISPs also incur costs associated with processing messages directed to recipients who do not hold an account with the ISP. For these recipients, the ISPs mail system typically generates an automatic "bounce" message that states that the recipient is unknown. Indeed, a "double bounce" may occur when a message bears an invalid sender address, and is sent to an invalid recipient. Costs are associated with maintaining the equipment, network bandwidth, and software that generates the bounce messages and for dispatching the bounce messages back into the network to the sender. Thus, there is a need for a system or method that can reduce the number of "bounce" and "double bounce" events experienced by ISPs and derived from unwanted messages.

Thus, the problem of "spam" in the Internet e-mail context is essentially a war of attrition. There are legitimate marketing organizations that send promotional messages by bulk e-mail, and other senders who send valid bulk messages. In general, however, no one benefits from the activities of "spammers," other than the "spammers" themselves. ISPs, business enterprises, and end users all suffer inconvenience, costs, and annoyances.

Even when ISPs and enterprises use anti-"spam" technologies, large numbers of "spam" messages may not be identified as spam, and many non-spam messages may be misclassified as spam. This costs e-mail marketers, and causes senders to lose confidence in the benefits of e-mail marketing. Moreover, end users are required to invest time in monitoring, checking, delivering, and negotiating blacklists, white lists, and similar mechanisms. The information from these lists can be conflicting, and therefore making a decision for a particular email sender based on the information in these lists can be difficult.

While the foregoing example problems exist in the context of e-mail, instant messaging, chat-room applications, Web message boards, telephone, and facsimile communications suffer from analogous problems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
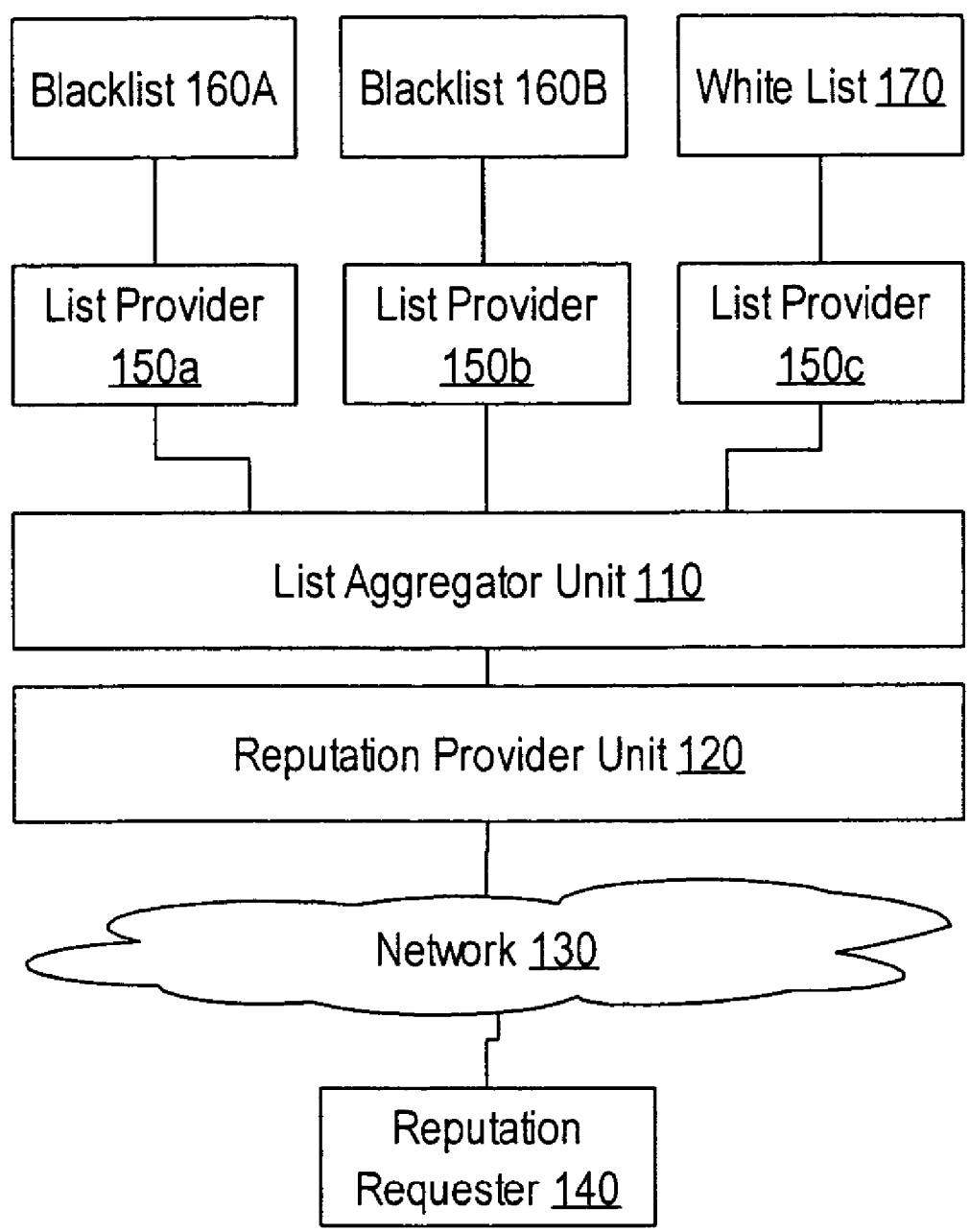
FIG. 1 is a block diagram that illustrates an overview of a system for determining the reputation of a message sender.

Techniques for determining the reputation of a message sender are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural Overview
  2.1 Example System Organization
  2.2 Sample Data Structure
 3.0 Functional Overview
  3.1 Maintaining Aggregate Lists
  3.2 Adding Entries to an Aggregate Data Structure
  3.3 Example Reputation Score Calculations
  3.4 Example Process for Estimating Whether a Message is Unsolicited
 4.0 Implementation Mechanisms—Hardware Overview
 5.0 Extensions and Alternatives 1.0 General Overview The needs identified in the foregoing Background, and other needs and objects that will become apparent for the following description, are achieved in the present invention, which comprises, in one aspect, a method for determining the reputation of a message sender. In other aspects, the invention encompasses a computer apparatus and a computer readable medium configured for determining the reputation of a message sender.

Generally, herein are provided techniques by which message receivers can determine the reputation of a message sender by obtaining two or more lists from two or more list providers; determining which lists of the two or more lists indicate the message sender; and determining the reputation score for the message sender based on which lists of the two or more lists indicate the message sender.

In a related feature, the techniques further include the step of storing information from the two or more lists in an aggregate list data structure, and where the step of determining what lists indicate the message sender includes the step of querying the aggregate list data structure. In a related feature, a particular list is one of the two or more lists and the particular list contains one or more entries, and where the step of storing information from the two or more lists in the aggregate list data structure includes the steps of determining the difference of the particular list with a previous version of the particular list; storing entries of the particular list that were not in the previous version of the particular list in the aggregate list data structure; and removing from the aggregate list data structure entries that are not in the particular list but were in the previous version of the particular list.

In a related feature, the step of determining the reputation score includes the steps of determining an individual score for each list of the two or more lists; and determining an output score based on the individual score for each list in the two or more lists. In a related feature, the step of determining the output score includes the steps of determining an aggregate score based on the individual score for each list of the two or more lists; determining a normalized score based on the aggregate score; and determining the output score based on the normalized score.

In a related feature, the individual score for each list in the two or more lists each includes an individual probability and a list of probabilities includes the individual probability for each list in the two or more lists, and where the step of determining the aggregate score based on the individual score for each list of the two or more lists includes performing a Chi Squared calculation on the list of probabilities. In a related feature, the techniques further include the step of receiving a request for the reputation of the message sender. In a related feature, the step of receiving the request for the reputation of the message sender includes receiving a request formatted as a DNS request. In a related feature, the message sender is associated with a particular IP address and the step of determining what lists of the two or more lists indicate the message sender includes determining for a particular list of the two or more lists whether the particular IP address of the message sender is contained in an IP address range indicated by the particular list. In a related feature, the techniques further include, if a particular list indicates an IP address range, setting a bit corresponding to the particular list in a particular list bit mask data structure corresponding to the IP address range.

In a related feature, the step of setting the bit corresponding to the particular list is performed for each list of the two or more lists, and where sender corresponds to a particular IP address, the particular IP address is contained within a first IP address range that has associated with it a first list bit mask, the IP address is contained within a second IP address range associated with a second list bit mask, and the method further includes the step of determining which lists of the two or more lists indicate the message sender by performing the steps of performing an or operation on the first list bit mask and second list bit mask to produce a third list bit mask; and determining what bits are set in the third list bit mask.

In another aspect techniques are provided for receiving a message from a message sender; obtaining a reputation score of the message sender, where the reputation score of the message sender was determined by performing the steps of obtaining two or more lists from two or more list providers; determining which lists of the two or more lists indicate the message sender; determining the reputation score for the message sender based on which lists of the two or more lists indicate the message sender; and if the reputation score is worse than a first predefined threshold, indicating that the message is unsolicited.

In a related feature, the techniques further include the step of, if the reputation score is better than a second predefined threshold, indicating that the message is valid, where the first predefined threshold is different from the second predefined threshold. In a related feature, the techniques further include the step of if the reputation score is better than the first predefined threshold and worse than the second predefined threshold, indicating that the message is not estimated as either valid or invalid. In a related feature, the techniques further include the step of sending a request for the reputation score of the message sender, and where the step of obtaining the reputation score of the message sender includes receiving a response to the request for the reputation score of the message sender. In a related feature, the step of sending the request for the reputation score of the message sender includes sending a particular request formatted as a DNS request.

In other aspects, the invention encompasses a computer apparatus and a computer-readable medium configured to carry out the foregoing steps.

2.0 Structural Overview

2.1 Example System Organization

FIG. 1 is a block diagram that illustrates an overview of a system for determining the reputation of a message sender.

A list aggregator unit 110 is communicatively coupled to two or more list providers 150. In the example shown, the list aggregator unit 110 is communicatively coupled to three list providers 150*a*, 105*b*, 150*c*. The list aggregator unit 110 is also communicatively coupled to a reputation provider unit 120. The reputation provider unit 120 is communicatively coupled to a network 130. A reputation requester 140 is also communicatively coupled to the network 130. In various embodiments, the network 130 is a wireless network, dial up access, the Internet, a LAN, a WAN, or any other communication network.

The list aggregator unit 110 and reputation provider unit 120 are each logical machines. Logical machines may comprise one or more computer programs or other software elements. Each logical machine may run on separate physical computing machines or may run on the same physical computing machine as one or more of the other logical machines. Various embodiments of computers and other physical computing machines are described in detail below in the section entitled Hardware Overview.

The reputation requester 140 can be any appropriate machine, user, or process capable of communicating a request over a network. For example, in one embodiment, a reputation requester 140 is a mail server running on a computer that has a network interface, and the mail server is capable of formulating a request for the reputation of an electronic message sender. In other embodiments, the reputation requestor 140 could be any mechanism requesting reputation information for a mail sender including an access server, gateway, firewall, mail transfer agent, mail client, mail filtering mechanism, etc.

The list providers 150*a*, 105*b*, 150*c* are any appropriate mechanism for providing lists 160*a*, 160*b*, 170 related to reputations of mail senders. For example, in one embodiment, the list providers 150*a*, 105*b*, 150*c* are modified domain name servers (DNSs) running on computers with network interfaces that are capable of providing lists 160*a*, 160*b*, 170 related to reputations of mail senders. In other embodiments, each of the list providers 150*a*, 105*b*, 150*c* is a FTP server, HTTP server, or any other appropriate mechanism capable of providing lists 160*a*, 160*b*, 170 related to reputations of mail senders.

2.1 Sample Data Structure

Figure 2:
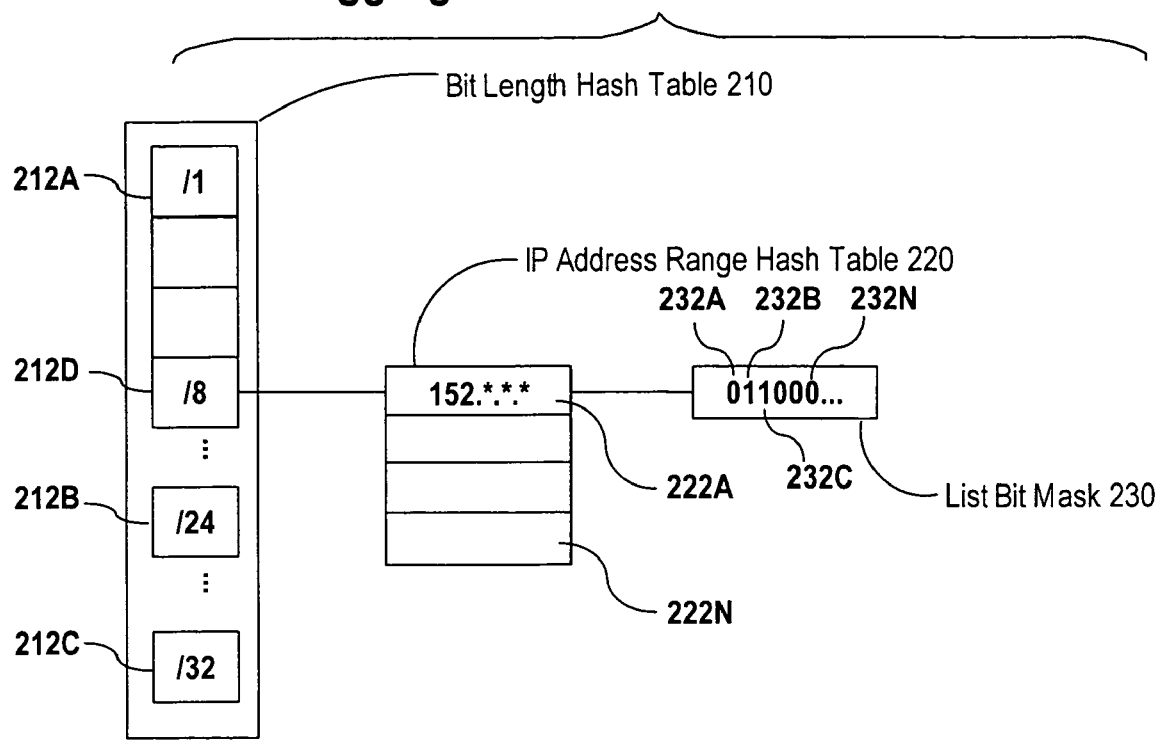
FIG. 2 is a block diagram of an example data structure that can be used in determining the reputation of a message sender.

FIG. 2 is a block diagram of an example data structure that can be used in determining the reputation of a message sender.

The aggregate list data structure 200 is an example of a data structure that can be used to efficiently store and provide information related to multiple mail senders. The techniques described herein are in no way limited to the use of this particular data structure. Any appropriate data structure or data set stored in a machine-readable medium could be used to store reputation information from multiple lists.

The aggregate list data structure 200 comprises a bit length hash table 210, an IP (Internet Protocol) address range hash table 220 as the value for each key in the bit length hash table 210, and a list bit mask 230 as the value for each key in the IP address range hash table 220. Although the example of FIG. 2 is illustrated for use with IP addresses, other embodiments may be used with other network address mechanisms or other appropriate identifiers, such as domain name, email address, geographical location, or any appropriate identification mechanism.

The use of the aggregate list data structure 200 is described in more detail below. However, a brief description is instructive as to its structure. The aggregate list data structure 200, as the name suggests, provides a single data structure in which reputation data from multiple reputation lists can be stored. In various embodiments, a reputation list can contain a positive or negative association with a single IP address or a range of IP addresses. In other embodiments, reputations are associated with something other than IP address, such as domain name, email address, geography, or any other appropriate value. For simplicity in explanation, in the examples given herein, reputations will be described as being associated with IP addresses and ranges.

A reputation list 160a, 160b, 170 from a reputation list provider 150a, 150b, 150c could take on any appropriate form such as a blacklist of IP addresses and ranges that indicate IP addresses from which electronic messages have a high likelihood of being unsolicited electronic messages, white lists of IP addresses that indicate IP addresses and ranges from which there is a low likelihood of an unsolicited electronic messages being sent, or any other appropriate types of lists.

The keys 212A, 212B, 212C, 212D in the bit length hash table 210 represent the length of defined significant digits of an IP address range associated with a reputation. Typically, IP addresses are 32 bits long, so the range of possible entries for a 32 bit IP address would be from /0 (no significant bits are defined) to /32 (all the bits are defined). For example, "/8" refers to a range where only the first eight bits are defined and is associated with key 212D. An example /8 entry could be "152.*.*.*" (where "*" represents a wildcard and signifies that the corresponding bits are not defined). IP addresses "152.2.128.152" and "152.123.234.4" would fall into the /8 range of "152.*.*.*". The IP address "153.2.128.152" would not fall into the /8 range of "152.*.*.*". In one embodiment, a key 212A, 212B, 212C, 212D is only added to the bit length hash table 210 if a range of IP addresses corresponding to that length is received in one of the reputation-related lists.

There is one IP address range hash table 220 for each key 212A-D in the bit length hash table 210. Each IP address range hash table 220 has a key 222A-N for each IP address range of the particular range length that is received from a list provider. For example, if two "/8" IP address ranges "152.*.*.*" and "159.*.*.*" were received from one or more list providers as part of one or more reputation lists, then two keys would be added to the IP address range hash table for /8: one corresponding to each of "152.*.*.*" and "159.*.*.*".

There is a list bit mask 230 corresponding to each entry 222A-222N in the IP address range hash table 220. The list bit mask 230 records which black or white lists include the IP address or range value of the entry 222A-222N that reference the list bit mask 230. In one embodiment, each list provider 105a-150c a corresponding bit 232A-232N in the list bit mask 230. In another embodiment, two or more list providers 105a-150c correspond to a single bit 232A-232N. In yet another embodiment, one list provider 150a corresponds to one or more bits 232A-232N. For simplicity in explanation, in the examples herein each list provider 150a-150c corresponds to a single bit 232A-232N. In one embodiment, if a list indicates or includes a particular IP address range of an entry 222A-222N, then a bit corresponding to that list is set to "1".

As an example, in the context of FIG. 1, consider a list provider 150a corresponding to bit 232C and a list provider 150b corresponding to bit 232B. If both list provider 150a and list provider 150b each provide a list that includes a /8 entry of "152.*.*.*" then bits 232C, 232B are set to "1". The rest of the bits in the list bit mask default to zero. If subsequently list provider 150c (corresponding to bit 232A) provides a list that does not include "152.*.*.*", then bit 232A will not be set to one, but will remain zero. Therefore the first three bits of the list bit mask 230 would read "011" as shown in FIG. 2.

3.0 Functional Overview 3.1 Maintaining Aggregate Lists

Figure 3:
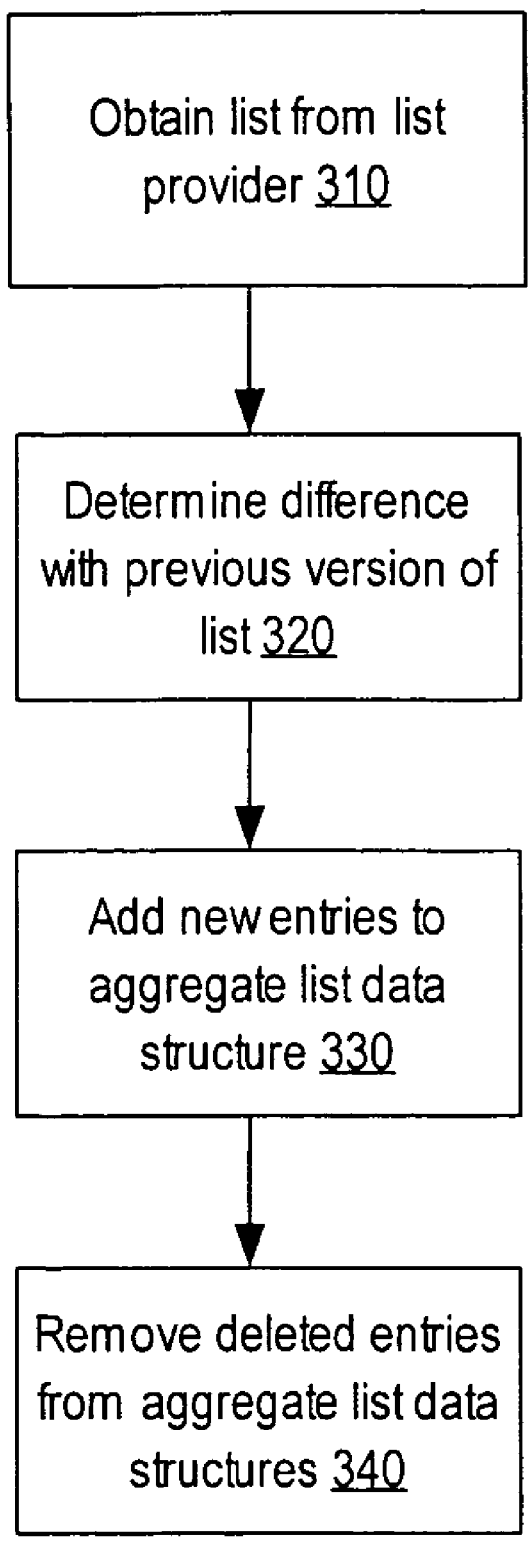
FIG. 3 is a flow diagram that depicts a method of maintaining an aggregate list of individual reputation-related lists.

FIG. 3 is a flow diagram that depicts a method of maintaining an aggregate list of individual reputation-related lists.

In various embodiments, one or more reputation lists are provided by reputation list providers. In one embodiment, system initialization includes determining at what interval updates to the lists will be obtained or determining what will trigger obtaining updates to the lists. In a related embodiment, determining when to obtain updates to the lists is based on how often a list is updated. For example, a blacklist of IP addresses could be known to be updated every few seconds, minutes, hours, days, weeks, etc., and obtaining updates to the list could be based on that known updating frequency. In various embodiments, the updating of the list is signaled by the list provider, is detectable by the list aggregator unit, or is otherwise signaled or detectable.

The steps of FIG. 3 are performed for each list of one or more lists from one or more list providers. In various embodiments, the lists from different list providers are obtained at different times or are obtained at the same time. The description of FIG. 3 below will discuss maintaining a single list from a single list provider.

In step 310, a particular list is obtained from a list provider. The particular list can be obtained in any number of ways. In various embodiments, the particular list is obtained using a DNS zone transfer; database export and later import; obtaining a file containing the list by file transfer protocol (FTP), hypertext transfer protocol (HTTP), secure HTTP (HTTPS), or the rsync protocol; or any other appropriate means. In various related embodiments, the step 310 of obtaining a list is initiated by a signal from the list processor or by the detection of the change in the list. In various embodiments, the step 310 of obtaining a list is initiated after a predefined period of time. In a related embodiment, the predefined period of time to wait before obtaining the list is based on a predetermined schedule of updates to the list.

A particular list obtained from a list provider can take any appropriate form. An example of an appropriate form could be a list of IP address ranges and IP addresses. For example, in the context of FIG. 1, a list aggregator unit 110 obtains a list 160A from a list provider 150a via DNS zone transfer and the list is in the form of a blacklist of IP addresses and IP address ranges.

In step 320, the difference between the current version of the particular list and any previous version of the particular list is determined. In one embodiment, if there is no previous version of the particular list then the difference between the particular list obtained in step 310 and "the previous list" is defined as the full list obtained in step 310. In various embodiments, if there is a previous version of the particular list, the difference between the version of the particular list obtained in step 310 and the previous version of the particular list is determined by using any appropriate tool, such as the Unix "diff" command, for example.

As noted above, there are numerous possible embodiments for the aggregate list and, therefore, there are numerous possible embodiments for steps 330 and 340. Steps 330 and 340, for sake of clarity of description, will be described in terms of data structures similar to the aggregate list data structure 200 of FIG. 2.

In step 330, the new entries are added to the aggregate list data structure. An example method for adding entries to an aggregate list data structure is depicted in and described herein with respect to FIG. 5.

When an entry is deleted from a particular list, its corresponding entries must be deleted from the aggregate list data structure as part of step 340. Deleting an entry from an aggregate list data structure can be accomplished by finding the IP address range hash table associated with the appropriate length entry in the bit length hash table; finding the list bit mask associated with the appropriate entry in the IP address range hash table; and setting the bit in the list bit mask corresponding to the particular list to "0". For example, in the context of FIG. 2, the entry "152.*.*.*" is deleted from the aggregate list data structure 200 by finding the "/8" entry 212D in the bit length hash table 210, finding the appropriate entry 222A in the IP address range hash table 220, and setting the bit 232A-232N corresponding to the particular list to "0" in the corresponding list bit mask 230.

Various embodiments of the techniques described in FIG. 3 enable the maintenance of an up-to-date aggregate list data structure that can be used to determine the reputation of a message sender.

Figure 4:
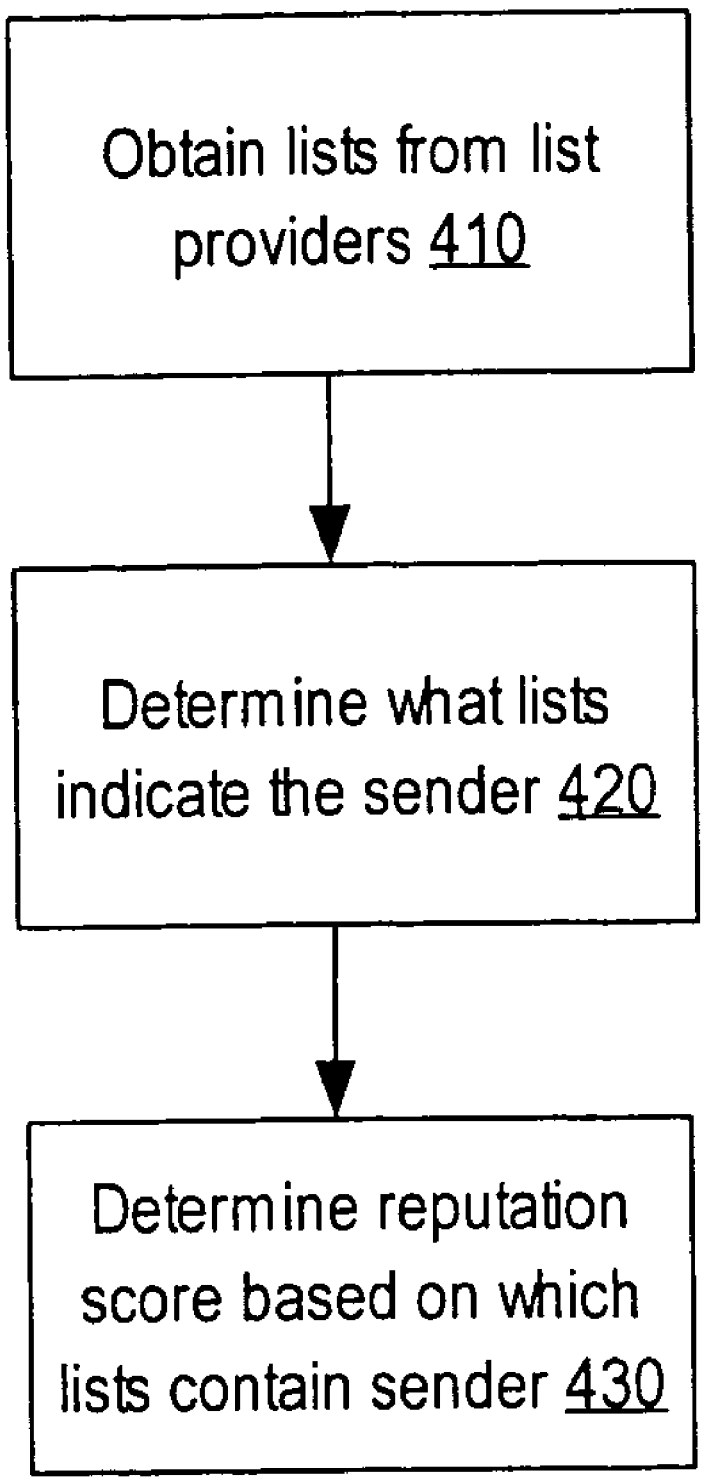
FIG. 4 is a flow diagram that depicts a method of determining the reputation of a message sender.

FIG. 4 is a flow diagram that depicts a method of determining the reputation of a message sender.

In one embodiment, the process of determining the reputation of a message sender is initiated by receiving a request for the reputation of an electronic message sender. In various embodiments, the request is received in extensible markup language (XML), hypertext markup language (HTML), formatted as a DNS request, or in any appropriate format. In various embodiments, the request is received via HTTP, HTTPS, TCP (transaction control protocol)/IP sockets, Universal Datagram Protocol (UDP) or via any other appropriate means. For example, a request for the reputation of an email sender could come in the form of a DNS request using TCP/IP or UDP.

As noted above, in one embodiment and in the examples used herein senders are identified by IP address. However, in other embodiments any other sender identification values may be used.

In step 410, two or more lists are obtained from two or more list providers. In various embodiments, these lists are obtained using DNS zone transfers; database exports and later imports; obtaining files containing the lists via file transfer protocol (FTP), hypertext transfer protocol (HTTP), secure HTTP (HTTPS), or the rsync protocol; or any other appropriate means. For example, in the context of FIG. 1, two or more lists are obtained from two list providers 150a and 150b.

In step 420, the lists that contain the sender are determined. In various embodiments, step 420 comprises parsing each list from each sender or querying an aggregate list, and aggregate list data structure, or other appropriate mechanism. For example, in the context of FIG. 2, determining if a particular list contains the IP address comprises accessing each IP address range hash table 220 for each length or key 212A-212D in the bit length hash table 210 and determining whether the IP address falls into any IP address range of an entry 222A-222N in the IP address range hash table 220 and checking to determine which bits 232A-232N are set in the list bit mask 230 for each matching entry in the IP address range hash table 220.

In order to determine whether an IP address is contained in a range represented in the IP address range hash table 220, the first X significant bits of the IP address are compared to the first X significant bits of the IP address ranges in entries of the table, where X is the number of bits defined by the corresponding key 212A-212D of the bit length hash table 210. In one embodiment, determining whether there is a corresponding entry 222A-222N in the IP address range hash table 220 comprises determining whether a key 222A-222N exists in the IP address range hash table 220 for the first X bits of the IP address.

In one embodiment, in order to determine which lists contain the IP address, the steps above are performed for each individual list separately or all lists are checked at once. In a related embodiment, there are two or more list bit masks 230 corresponding to matching entries 222A-222N in two or more IP address range hash table 220 corresponding to two or more entries in the bit length hash table 210. Further, determining which lists contain the IP address comprises performing the "or" operation on the two or more bit masks to result in creating a result bit mask. The result bit mask will have "1"s in any place that any individual list bit mask 230 has a "1" and will have a "0" only at those bits where no list bit mask 230 has a "1". In other embodiments, other logical or mathematical functions could be used to combine the list bit masks 230, such as addition, weighted addition, bitwise averaging, bitwise exclusive or, or any other appropriate function. In one embodiment, an aggregate list bit mask is used to store which lists indicate the IP address of the sender.

In step 430, a reputation score is determined based on which lists contain the sender. In various embodiments, the reputation score is determined as a weighted sum of the aggregate list bit mask or as a polynomial of the aggregate list bit mask. In one embodiment, determining the reputation score is based on which lists contain the IP address of the sender. Such an embodiment is depicted in and described with respect to FIG. 6.

Figure 7:
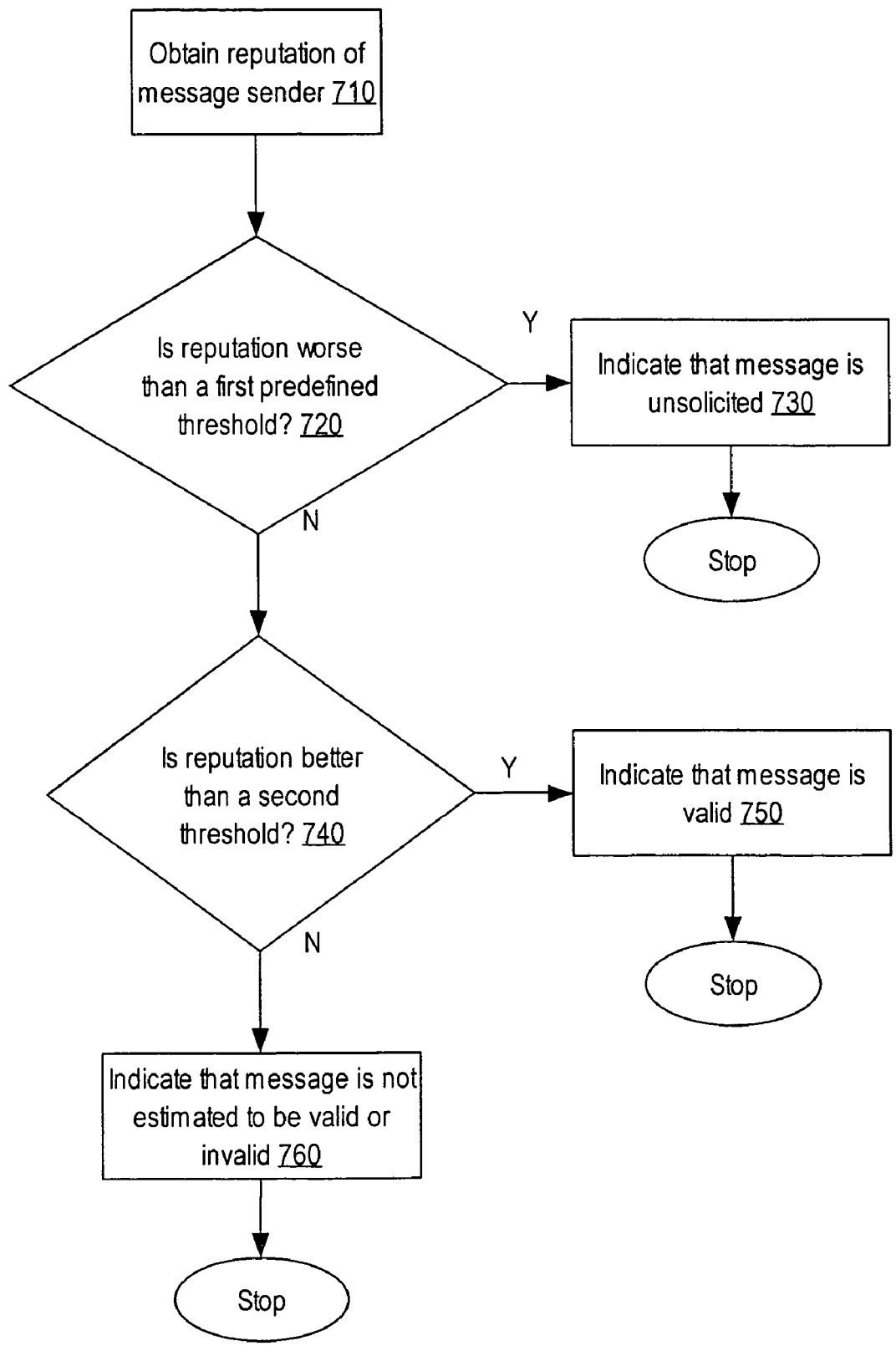
FIG. 7 is a flow diagram that depicts a process for estimating whether a message is unsolicited.

Various embodiments of FIG. 4 and the reputation score that is produced can be used to help estimate whether an electronic message from a message sender is unsolicited. An example of such a use is depicted in FIG. 7.

3.2 Adding Entries to an Aggregate Data Structure

Figure 5:
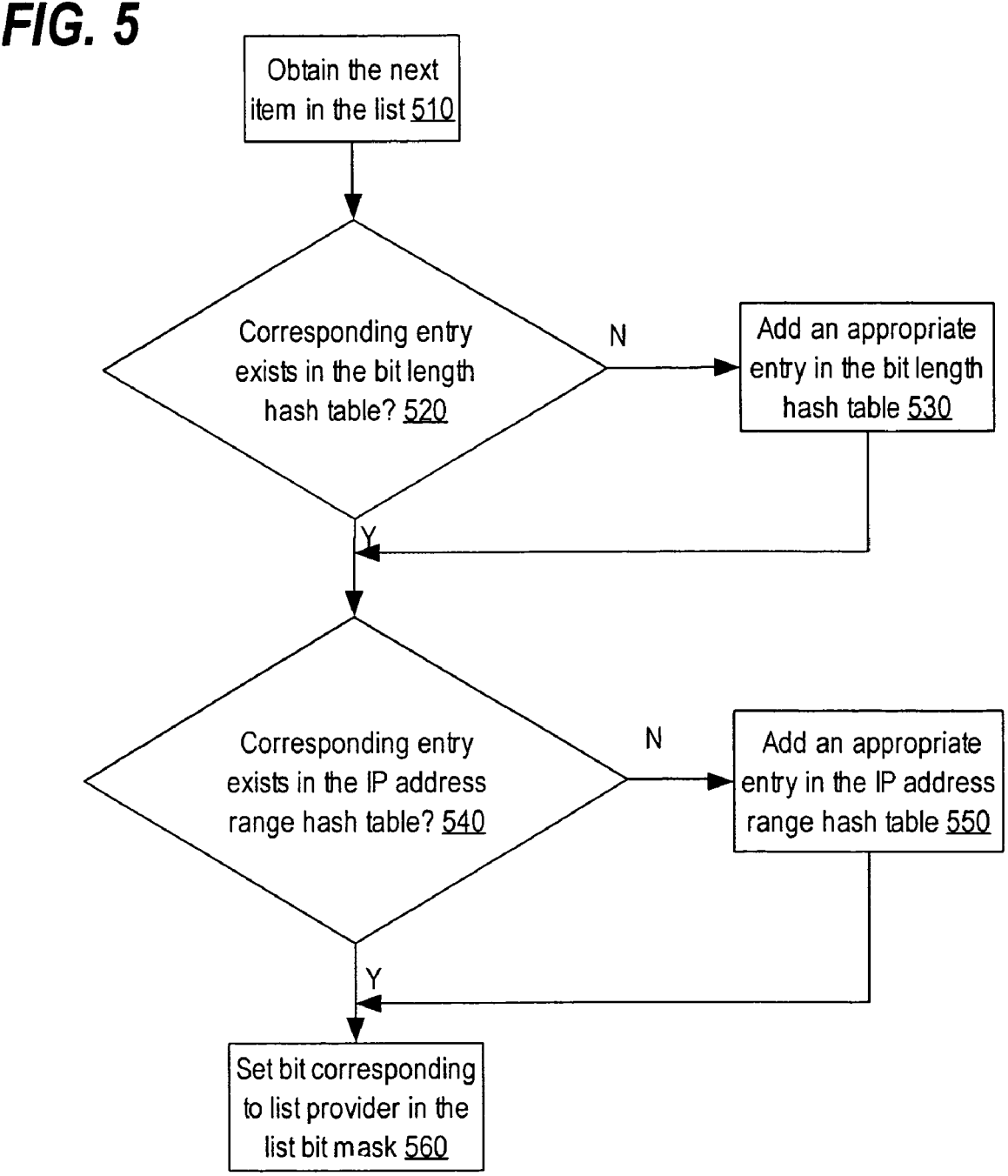
FIG. 5 is a flow diagram that depicts a process for adding entries to an aggregate list data structure.

FIG. 5 is a flow diagram that depicts a process for adding entries from a list to an aggregate list data structure.

In step 510, the next item in the list of items to be added is obtained. In one embodiment, the list of items to be added is associated with a particular list and the particular list is associated with a particular bit in each list bit mask. In one embodiment, if there are no more items in the list, then no more steps are taken. In various embodiments, obtaining the next item in the list comprises obtaining the next item from a structured list, obtaining the next item from a linked list, querying a data structure containing one or more items, or any appropriate means.

In step 520 a check is made to determine whether a corresponding entry exists in the bit length hash table. In various embodiments, this comprises determining the length of the item obtained in step 510. For example, in the context of FIG. 2, the item obtained in step 510 could be "152.*.*.*" which corresponds to a length of 8 bits "/8". Determining whether an entry for "/8" exists in the bit length hash table 210 would then comprise determining whether there already exists a "/8" key 212A-212D in the hash table.

If a corresponding entry does not exist, then an appropriate entry is added in step 530. In various embodiments, adding an appropriate entry comprises adding an appropriate key to a bit length hash table or any appropriate action.

After an appropriate entry is added in step 530 or if an entry already exists for that range (step 520), then a check is performed to determine whether the IP address range for the new entry already exists in the IP address range hash table. For example, in the context of FIG. 2, if the item obtained in step 510 is "152.*.*.*", a check is made to determine whether an entry 222A-222N exists for "152.*.*.*" in the /8 IP address range hash table 220 corresponding to the "/8" key 212D in the bit length hash table 210.

If there is no corresponding entry 222A-222N in the IP address range hash table 220, then in step 550 an entry is added to the appropriate data structure corresponding to the item obtained in step 510. In one embodiment, adding an entry comprises setting all the bits in the corresponding list bit mask 230 to zeros. For example, in the context of FIG. 2, if there is no entry for "152.*.*.*" in the IP address range hash table 220, then an entry is made for "152.*.*.*" in step 550 and all bits 232A-232N in the list bit mask 230 corresponding to the "152.*.*.*" are set to zero.

If an entry has been added or there is already a corresponding entry in the IP address range hash table, then in step 560, the list bit mask corresponding to the IP address range hash table entry for the added item is altered to indicate the particular list. For example, in the context of FIG. 2, if the entry for "152.*.*.*" is added to the IP address range hash table 220 or the entry already existed in the IP address range hash table 220, then in step 560 the bit in the list bit mask 230 corresponding to the list is set. For example, in the context of FIG. 2, the entry for "152.*.*.*" already exists and the bit in the list bit mask 230 corresponding to the list is set.

Various embodiments of FIG. 5 enable the aggregate list data structure to be updated with new information.

3.3 Example Reputation Score Calculations

Figure 6:
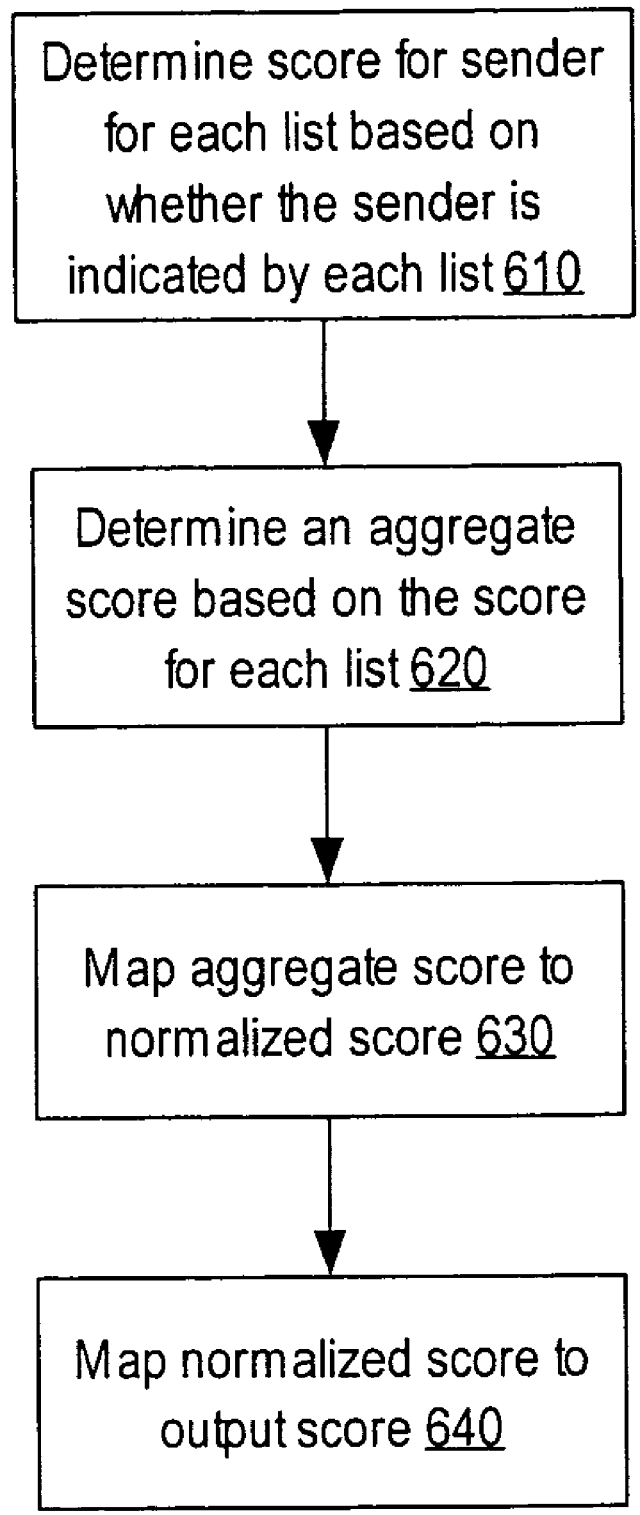
FIG. 6 is a flow diagram that depicts an example embodiment of determining a reputation score based on which lists indicate the sender.

FIG. 6 is a flow diagram that depicts an example embodiment of determining a reputation score based on which lists indicate the sender. FIG. 6 will be described assuming that the sender is associated with an IP address. The techniques described herein, however, are in no way limited to use of IP address as an identifier of a sender. In other embodiments, the sender is identified by domain name, email address, geographical location, or any appropriate mechanism.

In step 610, a score is obtained corresponding to each list. In one embodiment, this score is obtained by determining, for each blacklist 160A, 160B, whether the sender's IP address is in the particular list. If the IP address is indicated in the particular list, then the score for the list represents a certain percentage likelihood that the message is an unsolicited electronic message (often higher than 50%). If the IP address is not indicated in the particular list, then the score for the list still represents a certain percentage likelihood that the message is an unsolicited message (often less than 50%).

In one embodiment, this score is obtained by determining, for each "white" list, whether the sender's IP address is in the particular list. A white list is a list of IP addresses and ranges that are believed to be associated with senders of legitimate electronic messages. If the IP address is indicated in the particular list, then the score for the list represents a certain percentage likelihood that the message is unsolicited (often less than 50%). If the IP address is not indicated in the particular list, then the score for the list represents a certain percentage likelihood that the message is unsolicited (often higher than 50%).

In other embodiments, a white list or blacklist will contain ranges of IP addresses and exceptions to those IP addresses, thereby including all IP addresses in a range except those that are excluded. In various embodiments, the white lists and blacklists contain integer or floating point values indicating scores for IP address ranges and IP addresses, and these scores are used to determine an aggregate score for an IP address with respect to the lists. In one embodiment, the aggregate list data structure 200 of FIG. 2 is queried to determine which lists indicate the sender.

In step 620, an aggregate score is generated based on the scores for each list determined in step 610. In one embodiment, the score for each list is a percentage likelihood that a message is unsolicited and the aggregate score is an aggregate percentage likelihood that is generated based on the individual percentages likelihoods. In various embodiments, this aggregate percentage likelihood is based on a weighted average of the individual percentages likelihoods, a sum or product of the individual percentages likelihoods, a polynomial of the individual percentages likelihoods, or any appropriate calculation. In various embodiments, the aggregate percentage is based in part on the Chi Squared function over the probabilities, a Robinson calculation, a Bayes calculation, or any other appropriate mechanism. A particular embodiment of the Chi Squared function is depicted in the Python Programming Language (see the "python" commercial domain of the World Wide Web) code of Appendix A.

In step 630, the aggregate score is mapped to a normalized score. In one embodiment, the aggregate score is an aggregate percentage, and the normalized score is a mapped percentage that has the range from 0% to 100%, and step 630 is performed by mapping the aggregate percentage to the normalized range from 0% to 100%. In various embodiments, this mapping is linear, piecewise linear, cubic, polynomial, or uses any other appropriate function. In one embodiment, a piecewise linear method of mapping the aggregate function is used and comprises determining the known lowest possible probability (LP), the known average probability (AP), the known highest possible probability (HP), and linearly mapping percentages from LP to AP to 0% to 50% and percentages from AP to HP to 50% to 100%. In equation form, with aggregate probability represented as P, this can be represented as:

$$\text{Mapped Percentage } (MP) = \{\text{if } (P < AP); (P - LP) * 50 / (AP - LP)$$
$$\{\text{else; } (P - AP) * 50 / (HP - AP) + 50.$$

For example, if LP is 30%, AP is 40% and HP is 80%, then percentages from 30% to 40% would map to 0% to 50%; and percentages from 40% to 80% would map to 50% to 100%. In such an example, 35% would map to 25% and 60% would map to 75%.

In related embodiments, LP is determined by performing the calculations of step 620 using the lowest possible score (e.g. percentage) for each of the lists, and HP is determined by performing the calculations of step 620 using the highest possible score (e.g. percentage) for each of the lists, and AP is determined by performing the calculations of step 620 using a random sample of possible values and averaging the result.

In step 640, the normalized score is mapped to an output score. In one embodiment, a mapped percentage is mapped to an output (mapped) score. In various embodiments, this mapping is linear, piecewise liner, cubic, piecewise cubic, polynomial, or piecewise polynomial, exponential, piecewise exponential, or any appropriate mapping. In one embodiment, this mapping is performed by using a piecewise function such as:

$$\text{Mapped Score } (MS) = \{\text{if } MP < .5; (-\log(MP)/\log(2) - 1)/\text{lo\_k}$$
$$\{\text{else; } 1.0/\text{hi\_k} * (1 - 1/\log(2) * \log(1/(1 - MP)),$$

where lo_k and hi_k are constants. It may be beneficial to use hi_k and lo_k values approximately in the range of 0.5 and 2.0. It may be beneficial to use hi_k and lo_k values approximately in the range of 0.6 and 1.0. Hi_k and lo_k may each have the same value or may have different values.

Various embodiments depicted in FIG. 6 are examples of determining a reputation score for an electronic message sender based on which lists indicate the IP address of the sender. The various embodiments of FIG. 6 perform step 430 of FIG. 4. A result of FIG. 6 is determination of a composite score. In various embodiments of FIG. 6, some of the steps are not performed, and the composite score determined by the process of FIG. 6 is the aggregate score of step 620, the mapped score of step 630, or the output score of step 640.

3.4 Example Process for Estimating Whether a Message is Unsolicited

FIG. 7 is a flow diagram that depicts a process for estimating whether a message is unsolicited. The process of FIG. 7 may be implemented, for example, in the software or hardware of a reputation requestor 140, e.g. a mail transfer agent, that uses a reputation score value to determine how to process messages.

When a message arrives at a mail transfer agent or other system, it has a sender associated with it a. The sender can be defined by any appropriate identification mechanism. In various other embodiments, the sender is identified by IP address, domain name, email address, geographical location, or any other appropriate mechanism. In the examples used to described FIG. 7, it will be assumed that the message sender is identified by IP address.

In step 710, the reputation score of the message sender is obtained. In one embodiment, the process of FIG. 4 is used to obtain the reputation score of the message sender.

In step 720, the reputation score is compared to a first predefined threshold to determine whether it is worse than the predefined threshold. If the reputation score is worse than the predefined threshold, then the message is indicated as unsolicited in step 730. In various embodiments, if the message is indicated as unsolicited, the message is deleted, put in a trash folder, put in a "bulk mail folder", flagged to indicate that it is estimated as unsolicited, or any other appropriate action. After step 730 is performed, the process completes.

If the reputation score is not worse than a certain predefined threshold (step 720), then a check is made to determine whether the reputation score is better than a second predefined threshold in step 740. If the reputation score is better than a certain predefined threshold, then in step 750, it is indicated that the message is estimated as valid. In various embodiments, indicating that the message is estimated as valid comprises sending the message to the recipient's inbox without further filtering, sending the message to the recipient's inbox after limited filtering, allowing the message to bypass to regular filtering, flagging the message as valid, or any appropriate action. After step 750 is performed, the process completes.

If the reputation score for the sender is not better than a second predefined threshold (step 740), then in step 760 it is indicated that the message is not estimated as either valid or invalid. In various embodiments, indicating that the message is not estimated as either valid or invalid comprises applying filters to the message, forwarding the message to the recipient, not flagging the message as either valid or invalid, or any appropriate action.

Various embodiments of FIG. 7 allow for the use of a reputation score of a message sender to aid in the detection of valid and unsolicited messages. Such embodiments can be beneficial in that they allow for more accurate and more efficient filtering of messages.

4.0 Implementation Mechanisms—Hardware Overview

Figure 8:
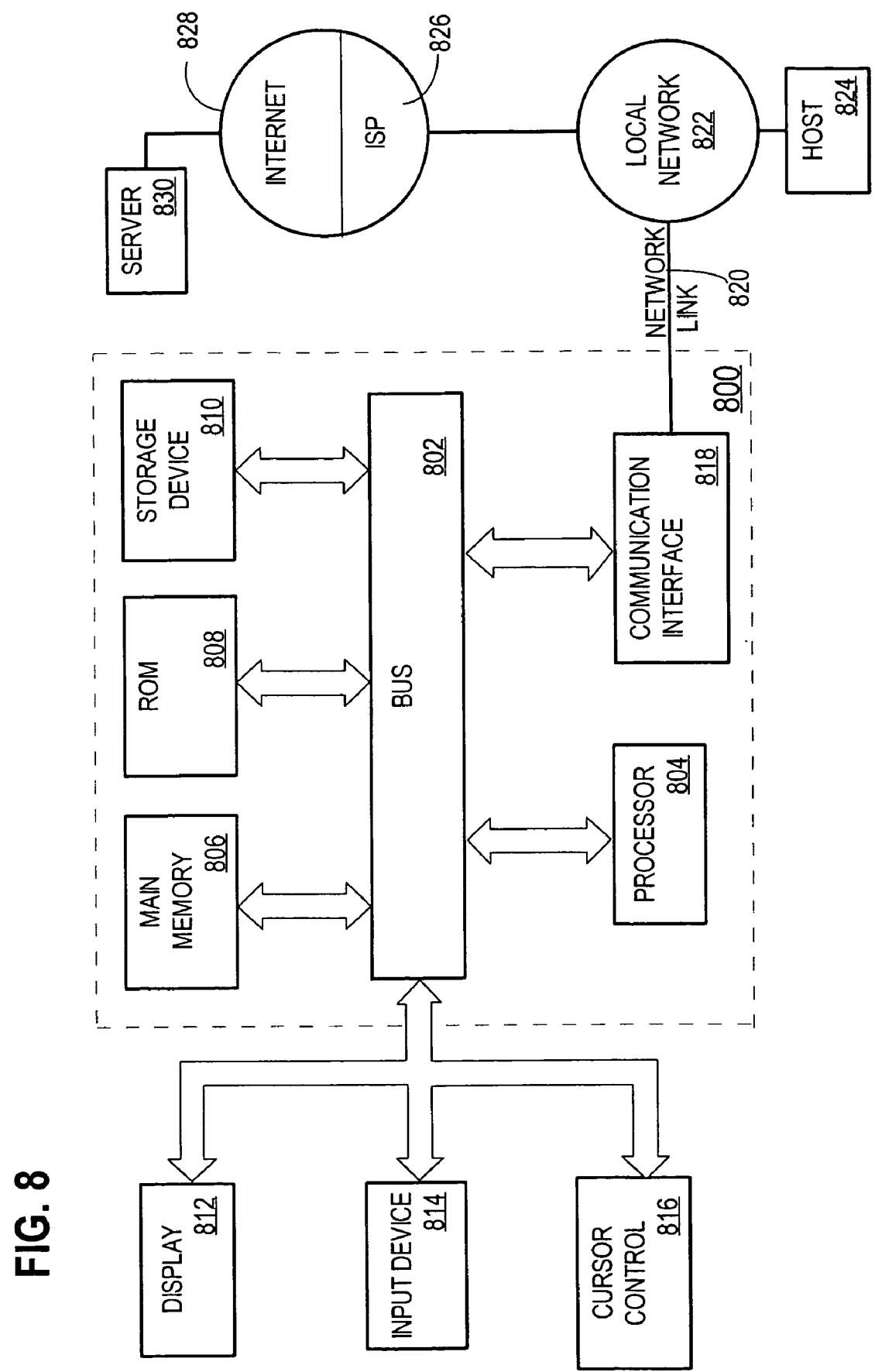
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for electronic message delivery approaches. According to one embodiment of the invention, electronic message delivery approaches are provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, and non-volatile media. Non-volatile media includes, for example, optical or magnetic disks, such as storage device 810. Volatile media includes dynamic memory, such as main memory 806.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for electronic message delivery approaches as described herein.

The received code may be executed by processor 804 as it is received, and/or stored in storage device 810, or other non-volatile storage for later execution. In this manner, computer system 800 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX A

A.1 Function for Summing Terms for Chi Squared:

```
def chi2q(x2, v):
    if v and v % 2:
        raise "Error: v must be even in chi2q."
    m = x2/2.0
    term = math.exp(0 – m)
```

-continued

```
    sum = term
    for i in range (1, v/2):
        term *= m / i
        sum += term
    return sum < 1.0 and sum or 1.0
```

A.2 Function for Calculating Chi Squared Value for a List of Probabilities

```
def chi_squared_probs_combine(sorted):
    if not len(sorted):
        return .5
    H = 1.0
    S = 1.0
    Hexp = 0
    Sexp = 0
    for prob in sorted:
        S *= 1.0 – prob
        H *=prob
        if S < 1e–200:
            S, e = math.frexp(S)
            Sexp += e
        if H < 1e–200:
            H, e = math.frexp(H)
            Hexp += e
    ln2 = math.log(2)
    S = math.log(S) + Sexp * ln2
    H = math.log(H) + Hexp * ln2
    S = 1.0 – chi2q(–2.0 * S, 2 * len(sorted))
    H = 1.0 – chi2q(–2.0 * H, 2 * len(sorted))
    return ((S – H) + 1.0 ) /2.0
```

What is claimed is:

1. A method of determining a reputation of a message sender comprising the machine-implemented steps of:
   obtaining two or more lists from two or more list providers;
   determining which lists of the two or more lists indicate the message sender;
   extracting from each list of the two or more lists indicating the message sender an individual score for the message sender, representing an individual probability that the message sender sent an unsolicited message; and
   computing a reputation score for the message sender from the individual scores for the message sender from each list of the two or more lists indicating the message sender;
   wherein the step of computing the reputation score comprises determining an aggregate score based on the individual score for each list of the two or more lists by performing at least one of a Chi Squared calculation, a Robinson calculation and a Bayes calculation on the individual scores for the message sender;
   wherein the method is performed by one or more processors.

2. The method of claim 1, wherein the method further comprises the step of storing information from the two or more lists in an aggregate list data structure, and wherein the step of determining what lists indicate the message sender comprises the step of querying the aggregate list data structure.

3. The method of claim 2, wherein a particular list is one of the two or more lists and the particular list contains one or more entries, and wherein the step of storing information from the two or more lists in the aggregate list data structure comprises the steps of:

determining the difference of the particular list with a previous version of the particular list;

storing entries of the particular list that were not in the previous version of the particular list in the aggregate list data structure; and removing from the aggregate list data structure entries that are not in the particular list but were in the previous version of the particular list.

4. The method of claim 1, wherein the step of computing the reputation score further comprises the steps of:

determining an output score based on the individual score for each list in the two or more lists.

5. The method of claim 4, wherein the step of determining the output score comprises the steps of:

determining a normalized score based on the aggregate score; and determining the output score based on the normalized score.

6. The method of claim 1, wherein the method further comprises the step of receiving a request for the reputation of the message sender.

7. The method of claim 6, wherein the step of receiving the request for the reputation of the message sender comprises receiving a request formatted as a DNS request.

8. The method of claim 1, wherein the message sender is associated with a particular IP address and the step of determining what lists of the two or more lists indicate the message sender comprises determining for a particular list of the two or more lists whether the particular IP address of the message sender is contained in an IP address range indicated by the particular list.

9. The method of claim 1, further comprising the step of, when a particular list indicates an IP address range, setting a bit corresponding to the particular list in a particular list bit mask data structure corresponding to the IP address range.

10. The method of claim 9, wherein the step of setting the bit corresponding to the particular list is performed for each list of the two or more lists, and wherein sender corresponds to a particular IP address, the particular IP address is contained within a first IP address range that has associated with it a first list bit mask, the IP address is contained within a second IP address range associated with a second list bit mask, and the method further comprises the step of determining which lists of the two or more lists indicate the message sender by performing the steps of:

performing an or operation on the first list bit mask and second list bit mask to produce a third list bit mask; and determining what bits are set in the third list bit mask.

11. A method comprising the machine-implemented steps of:

receiving a message from a message sender;

obtaining a reputation score of the message sender, wherein the reputation score of the message sender was determined by performing the steps of:

obtaining two or more lists from two or more list providers;

determining which lists of the two or more lists indicate the message sender;

extracting from each list of the two or more lists indicating the message sender an individual score for the message sender, representing an individual probability that the message sender sent an unsolicited message;

computing the reputation score for the message sender from the individual scores for the message sender from each list of the two or more lists indicating the message sender; wherein the step of computing the reputation score comprises determining an aggregate score based on the individual score for each list of the two or more lists by performing at least one of a Chi Squared calculation, a Robinson calculation and a Bayes calculation on the individual scores for the message sender; and when the reputation score is worse than a first predefined threshold, performing a specified action associated with responding to the unsolicited message;

wherein the method is performed by one or more processors.

12. The method of claim 11, wherein the step of performing the specified action comprises indicating that the message is unsolicited.

13. The method of claim 11, wherein the step of performing the specified action comprises deleting the message.

14. The method of claim 11, wherein the step of performing the specified action comprises moving the message into a trash message folder.

15. The method of claim 11, wherein the step of performing the specified action comprises moving the message into a bulk mail message folder.

16. The method of claim 11, wherein the step of performing the specified action comprises associating the message with a first flag, wherein the first flag indicates that the message is estimated to be unsolicited.

17. The method of claim 11, wherein the method further comprises the step of:

when the reputation score is better than a second predefined threshold, performing a second specified action associated with responding to messages that are not unsolicited, wherein the first predefined threshold is different from the second predefined threshold.

18. The method of claim 17, wherein the step of performing the second specified action comprises indicating that the message is valid.

19. The method of claim 17, wherein the message is associated with a message recipient, and wherein the step of performing the second specified action comprises sending the message to the message recipient.

20. The method of claim 17, wherein the step of performing the second specified action comprises performing one or more filter operations on the message.

21. The method of claim 17, wherein the step of performing the second specified action comprises associating the message with a second flag, wherein the second flag indicates that the message is estimated to be valid.

22. The method of claim 17, wherein the method further comprises the step of:

when the reputation score is better than the first predefined threshold and worse than the second predefined threshold, performing a third specified action.

23. The method of claim 22, wherein the step of performing the third specified action comprises indicating that the message has a first quality, where the first quality indicates that the message is not estimated as valid and the message is not indicated as invalid.

24. The method of claim 22, wherein the step of performing the third specified action comprises performing one or more filter operations on the message.

25. The method of claim 22, wherein the message is associated with a message recipient, and wherein the step of performing the third specified action comprises sending the message to the message recipient.

26. The method of claim 22, wherein the step of performing the third specified action comprises associating with the message a third flag, wherein the third flag indicates that the message is not estimated to be either valid or invalid.

27. The method of claim 11, wherein the method further comprises the step of sending a request for the reputation score of the message sender to a service for determining the reputation of the message sender, and wherein the step of obtaining the reputation score of the message sender comprises receiving a response to the request for the reputation score of the message sender from the service for determining a reputation of the message sender.

28. The method of claim 27, wherein the step of sending the request for the reputation score of the message sender comprises sending a DNS request and receiving the response to the request for the reputation score of the message sender comprises receiving a DNS response.

29. A non-transitory machine-readable storage medium storing one or more sequences of instructions for determining a reputation of a message sender, which instructions, when executed by one or more processors, cause the one or more processors to carry out the steps of:
   obtaining two or more lists from two or more list providers;
   determining which lists of the two or more lists indicate the message sender;
   extracting from each list of the two or more lists indicating the message sender an individual score for the message sender, representing an individual probability that the message sender sent an unsolicited message; and
   computing a reputation score for the message sender from the individual scores for the message sender from each list of the two or more lists indicating the message sender; wherein the step of computing the reputation score comprises determining an aggregate score based on the individual score for each list of the two or more lists by performing at least one of a Chi Squared calculation, a Robinson calculation and a Bayes calculation on the individual scores for the message sender.

30. A machine-readable storage medium as recited in claim 29, further comprising instructions which, when executed by the one or more processors, cause the one or more processors to carry out the step of storing information from the two or more lists in an aggregate list data structure, and wherein the step of determining what lists indicate the message sender comprises the step of querying the aggregate list data structure.

31. A machine-readable storage medium as recited in claim 30, wherein a particular list is one of the two or more lists and the particular list contains one or more entries, and wherein the step of storing information from the two or more lists in the aggregate list data structure comprises the steps of:
   determining the difference of the particular list with a previous version of the particular list;
   storing entries of the particular list that were not in the previous version of the particular list in the aggregate list data structure; and
   removing from the aggregate list data structure entries that are not in the particular list but were in the previous version of the particular list.

32. The machine-readable storage medium of claim 29, wherein the step of computing the reputation score comprises the steps of:
   determining an output score based on the individual score for each list in the two or more lists.

33. The machine-readable storage medium of claim 32, wherein the step of determining the output score comprises the steps of:
   determining a normalized score based on the aggregate score; and
   determining the output score based on the normalized score.

34. The machine-readable storage medium of claim 29, further comprising instructions which, when executed by the one or more processors, cause the one or more processors to carry out the step of receiving a request for the reputation of the message sender.

35. The machine-readable storage medium of claim 34, wherein the step of receiving the request for the reputation of the message sender comprises receiving a request formatted as a DNS request.

36. The machine-readable storage medium of claim 29, wherein the message sender is associated with a particular IP address and the step of determining what lists of the two or more lists indicate the message sender comprises determining for a particular list of the two or more lists whether the particular IP address of the message sender is contained in an IP address range indicated by the particular list.

37. The machine-readable storage medium of claim 29, further comprising instructions which, when executed by the one or more processors, cause the one or more processors to carry out the step of, when a particular list indicates an IP address range, setting a bit corresponding to the particular list in a particular list bit mask data structure corresponding to the IP address range.

38. The machine-readable storage medium of claim 37, wherein the step of setting the bit corresponding to the particular list is performed for each list of the two or more lists, and wherein sender corresponds to a particular IP address, the particular IP address is contained within a first IP address range that has associated with it a first list bit mask, the IP address is contained within a second IP address range associated with a second list bit mask, and wherein the machine-readable storage medium further comprises instructions which, when executed by the one or more processors, cause the one or more processors to carry out the step of determining which lists of the two or more lists indicate the message sender by performing the steps of:
   performing an or operation on the first list bit mask and second list bit mask to produce a third list bit mask; and
   determining what bits are set in the third list bit mask.

39. A non-transitory machine-readable storage medium carrying one or more sequences of instructions, which instructions, when executed by one or more processors, cause the one or more processors to carry out the steps of:
   receiving a message from a message sender;
   obtaining a reputation score of the message sender, wherein the reputation score of the message sender was determined by performing the steps of:
      obtaining two or more lists from two or more list providers;
      determining which lists of the two or more lists indicate the message sender;
      extracting from each list of the two or more lists indicating the message sender an individual score for the message sender, representing an individual probability that the message sender sent an unsolicited message;
      computing the reputation score for the message sender from the individual scores for the message sender from each list of the two or more lists indicating the message sender; wherein the step of computing the reputation score comprises determining an aggregate score based on the individual score for each list of the two or more lists by performing at least one of a Chi Squared calculation, a Robinson calculation and a Bayes calculation on the individual scores for the message sender; and when the reputation score is worse than a first predefined threshold, performing a specified action associated with responding to the unsolicited message.

40. The machine-readable storage medium of claim 39, wherein the step of performing the specified action comprises indicating that the message is unsolicited.

41. The machine-readable storage medium of claim 39, wherein the step of performing the specified action comprises deleting the message.

42. The machine-readable storage medium of claim 39, wherein the step of performing the specified action comprises moving the message into a trash message folder.

43. The machine-readable storage medium of claim 39, wherein the step of performing the specified action comprises moving the message into a bulk mail message folder.

44. The machine-readable storage medium of claim 39, wherein the step of performing the specified action comprises associating the message with a first flag, wherein the first flag indicates that the message is estimated to be unsolicited.

45. The machine-readable storage medium of claim 39, further comprising instructions which, when executed by the one or more processors, cause the one or more processors to carry out the step of:
when the reputation score is better than a second predefined threshold, performing a second specified action associated with responding to messages that are not unsolicited, wherein the first predefined threshold is different from the second predefined threshold.

46. The machine-readable storage medium of claim 45, wherein the step of performing the second specified action comprises indicating that the message is valid.

47. The machine-readable storage medium of claim 45, wherein the message is associated with a message recipient, and wherein the step of performing the second specified action comprises sending the message to the message recipient.

48. The machine-readable storage medium of claim 45, wherein the step of performing the second specified action comprises performing one or more filter operations on the message.

49. The machine-readable storage medium of claim 45, wherein the step of performing the second specified action comprises associating the message with a second flag, wherein the second flag indicates that the message is estimated to be valid.

50. The machine-readable storage medium of claim 45, further comprising instructions which, when executed by the one or more processors, cause the one or more processors to carry out the step of:
when the reputation score is better than the first predefined threshold and worse than the second predefined threshold, performing a third specified action.

51. The machine-readable storage medium of claim 50, wherein the step of performing the third specified action comprises indicating that the message has a first quality, where the first quality indicates that the message is not estimated as valid and the message is not indicated as invalid.

52. The machine-readable storage medium of claim 50, wherein the step of performing the third specified action comprises performing one or more filter operations on the message.

53. The machine-readable storage medium of claim 50, wherein the message is associated with a message recipient, and wherein the step of performing the third specified action comprises sending the message to the message recipient.

54. The machine-readable storage medium of claim 50, wherein the step of performing the third specified action comprises associating with the message a third flag, wherein the third flag indicates that the message is not estimated to be either valid or invalid.

55. The machine-readable storage medium of claim 39, further comprising instructions which, when executed by the one or more processors, cause the one or more processors to carry out the step of sending a request for the reputation score of the message sender to a service for determining the reputation of the message sender, and wherein the step of obtaining the reputation score of the message sender comprises receiving a response to the request for the reputation score of the message sender from the service for determining a reputation of the message sender.

56. The machine-readable storage medium of claim 55, wherein the step of sending the request for the reputation score of the message sender comprises sending a DNS request and receiving the response to the request for reputation score of the message sender comprises receiving a DNS response.

57. An apparatus for determining a reputation of a message sender, comprising:
one or more processors;
means for obtaining two or more lists from two or more list providers;
means for determining which lists of the two or more lists indicate the message sender;
means for extracting from each list of the two or more lists indicating the message sender an individual score for the message sender, representing an individual probability that the message sender sent an unsolicited message; and
means for computing a reputation score for the message sender from the individual scores for the message sender from each list of the two or more lists indicating the message sender; wherein the step of computing the reputation score comprises determining an aggregate score based on the individual score for each list of the two or more lists by performing at least one of a Chi Squared calculation, a Robinson calculation and a Bayes calculation on the individual scores for the message sender.

58. The apparatus of claim 57, further comprising means for storing information from the two or more lists in an aggregate list data structure, and wherein the means for determining what lists indicate the message sender comprises means for querying the aggregate list data structure.

59. The apparatus of claim 58, wherein a particular list is one of the two or more lists and the particular list contains one or more entries, and wherein the means for storing information from the two or more lists in the aggregate list data structure comprises:
means for determining the difference of the particular list with a previous version of the particular list;
means for storing entries of the particular list that were not in the previous version of the particular list in the aggregate list data structure; and
means for removing from the aggregate list data structure entries that are not in the particular list but were in the previous version of the particular list.

60. The apparatus of claim 57, wherein the means for computing the reputation score comprises:
means for determining an output score based on the individual score for each list in the two or more lists.

61. The apparatus of claim 60, wherein the means for determining the output score comprises:
means for determining a normalized score based on the aggregate score; and
means for determining the output score based on the normalized score.

62. The apparatus of claim 57, further comprising means for receiving a request for the reputation of the message sender.

63. The apparatus of claim 62, wherein the means for receiving the request for the reputation of the message sender comprises means for receiving a request formatted as a DNS request.

64. The apparatus of claim 57, wherein the message sender is associated with a particular IP address and the means for determining what lists of the two or more lists indicate the message sender comprises means for determining for a particular list of the two or more lists whether the particular IP address of the message sender is contained in an IP address range indicated by the particular list.

65. The apparatus of claim 57, further comprising means for setting a bit corresponding to a particular list in a particular list bit mask data structure corresponding to an IP address range when the particular list indicates the IP address range.

66. The apparatus of claim 65, wherein the means for setting the bit corresponding to the particular list comprises means for setting the bit corresponding to each list of the two or more lists, and wherein sender corresponds to a particular IP address, the particular IP address is contained within a first IP address range that has associated with it a first list bit mask, the IP address is contained within a second IP address range associated with a second list bit mask, and the apparatus further comprises means for determining which lists of the two or more lists indicate the message sender, and the means for determining which lists of the two or more lists indicate the message sender comprises:
  means for performing an or operation on the first list bit mask and second list bit mask to produce a third list bit mask; and
  means for determining what bits are set in the third list bit mask.

67. An apparatus comprising:
one or more processors;
means for receiving a message from a message sender;
means for obtaining a reputation score of the message sender, wherein the reputation score of the message sender was determined by performing the steps of:
  obtaining two or more lists from two or more list providers;
  determining which lists of the two or more lists indicate the message sender;
  extracting from each list of the two or more lists indicating the message sender an individual score for the message sender, representing an individual probability that the message sender sent an unsolicited message;
computing the reputation score for the message sender from the individual scores for the message sender from each list of the two or more lists indicating the message sender; wherein the step of computing the reputation score comprises determining an aggregate score based on the individual score for each list of the two or more lists by performing at least one of a Chi Squared calculation, a Robinson calculation and a Bayes calculation on the individual scores for the message sender; and
means for performing a specified action associated with responding to the unsolicited message, when the reputation score is worse than a first predefined threshold.

68. The apparatus of claim 67, wherein the means for performing the specified action comprises means for indicating that the message is unsolicited.

69. The apparatus of claim 67, wherein the means for performing the specified action comprises means for deleting the message.

70. The apparatus of claim 67, wherein the means for performing the specified action comprises means for moving the message into a trash message folder.

71. The apparatus of claim 67, wherein the means for performing the specified action comprises means for moving the message into a bulk mail message folder.

72. The apparatus of claim 67, wherein the means for performing the specified action comprises means for associating the message with a first flag, wherein the first flag indicates that the message is estimated to be unsolicited.

73. The apparatus of claim 67, wherein the apparatus further comprises:
  means for performing a second specified action associated with responding to messages that are not unsolicited, when the reputation score is better than a second predefined threshold, wherein the first predefined threshold is different from the second predefined threshold.

74. The apparatus of claim 73, wherein the means for performing the second specified action comprises means for indicating that the message is valid.

75. The apparatus of claim 73, wherein the message is associated with a message recipient, and wherein the means for performing the second specified action comprises means for sending the message to the message recipient.

76. The apparatus of claim 73, wherein the means for performing the second specified action comprises means for performing one or more filter operations on the message.

77. The apparatus of claim 73, wherein the means for performing the second specified action comprises means for associating the message with a second flag, wherein the second flag indicates that the message is estimated to be valid.

78. The apparatus of claim 73, wherein the apparatus further comprises:
  means for performing a third specified action, when the reputation score is better than the first predefined threshold and worse than the second predefined threshold.

79. The apparatus of claim 78, wherein the means for performing the third specified action comprises means for indicating that the message has a first quality, where the first quality indicates that the message is not estimated as valid and the message is not indicated as invalid.

80. The apparatus of claim 78, wherein the means for performing the third specified action comprises means for performing one or more filter operations on the message.

81. The apparatus of claim 78, wherein the message is associated with a message recipient, and wherein the means for performing the third specified action comprises means for sending the message to the message recipient.

82. The apparatus of claim 78, wherein the means for performing the third specified action comprises means for associating with the message a third flag, wherein the third flag indicates that the message is not estimated to be either valid or invalid.

83. The apparatus of claim 67, wherein the apparatus further comprises means for sending a request for the reputation score of the message sender to a service for determining the reputation of the message sender, and wherein the means for obtaining the reputation score of the message sender comprises means for receiving a response to the request for the reputation score of the message sender from the service for determining a reputation of the message sender.

84. The apparatus of claim 83, wherein the means for sending the request for the reputation score of the message sender comprises means for sending a DNS request and the means for receiving the response to the request for the reputation score of the message sender comprises means for receiving a DNS response.

85. An apparatus for determining a reputation of a message sender, comprising:
 a network interface that is coupled to a data network for receiving one or more packet flows therefrom;
 a processor;
 one or more stored sequences of instructions which, when executed by the processor, cause the processor to carry out the steps of:
  obtaining two or more lists from two or more list providers;
  determining which lists of the two or more lists indicate the message sender;
  extracting from each list of the two or more lists indicating the message sender an individual score for the message sender, representing an individual probability that the message sender sent an unsolicited message; and
  computing a reputation score for the message sender from the individual scores for the message sender from each list of the two or more lists indicating the message sender; wherein the step of computing the reputation score comprises determining an aggregate score based on the individual score for each list of the two or more lists by performing at least one of a Chi Squared calculation, a Robinson calculation and a Bayes calculation on the individual scores for the message sender.

86. The apparatus of claim 85, further comprising one or more stored sequences of instructions which, when executed by the one or more processors, cause the one or more processors to carry out the step of storing information from the two or more lists in an aggregate list data structure, and wherein the step of determining what lists indicate the message sender comprises the step of querying the aggregate list data structure.

87. The apparatus of claim 86, wherein a particular list is one of the two or more lists and the particular list contains one or more entries, and wherein the step of storing information from the two or more lists in the aggregate list data structure comprises the steps of:
 determining the difference of the particular list with a previous version of the particular list;
 storing entries of the particular list that were not in the previous version of the particular list in the aggregate list data structure; and
 removing from the aggregate list data structure entries that are not in the particular list but were in the previous version of the particular list.

88. The apparatus of claim 85, wherein the step of computing the reputation score comprises the steps of:
 determining an output score based on the individual score for each list in the two or more lists.

89. The apparatus of claim 88, wherein the step of determining the output score comprises the steps of:
 determining a normalized score based on the aggregate score; and
 determining the output score based on the normalized score.

90. The apparatus of claim 85, further comprising one or more stored sequences of instructions which, when executed by the one or more processors, cause the one or more processors to carry out the step of receiving a request for the reputation of the message sender.

91. The apparatus of claim 90, wherein the step of receiving the request for the reputation of the message sender comprises receiving a request formatted as a DNS request.

92. The apparatus of claim 85, wherein the message sender is associated with a particular IP address and the step of determining what lists of the two or more lists indicate the message sender comprises determining for a particular list of the two or more lists whether the particular IP address of the message sender is contained in an IP address range indicated by the particular list.

93. The apparatus of claim 85, further comprising one or more stored sequences of instructions which, when executed by the one or more processors, cause the one or more processors to carry out the step of, when a particular list indicates an IP address range, setting a bit corresponding to the particular list in a particular list bit mask data structure corresponding to the IP address range.

94. The apparatus of claim 93, wherein the step of setting the bit corresponding to the particular list is performed for each list of the two or more lists, and wherein sender corresponds to a particular IP address, the particular IP address is contained within a first IP address range that has associated with it a first list bit mask, the IP address is contained within a second IP address range associated with a second list bit mask, and wherein the apparatus further comprises one or more stored sequences of instructions which, when executed by the one or more processors, cause the one or more processors to carry out the step of determining which lists of the two or more lists indicate the message sender by performing the steps of:
 performing an or operation on the first list bit mask and second list bit mask to produce a third list bit mask; and
 determining what bits are set in the third list bit mask.

95. An apparatus for determining a reputation of a message sender, comprising:
 a network interface that is coupled to a data network for receiving one or more packet flows therefrom;
 a processor;
 one or more stored sequences of instructions which, when executed by the processor, cause the processor to carry out the steps of:
  receiving a message from a message sender;
  obtaining a reputation score of the message sender, wherein the reputation score of the message sender was determined by performing the steps of:
   obtaining two or more lists from two or more list providers;
   determining which lists of the two or more lists indicate the message sender;
   extracting from each list of the two or more lists indicating the message sender an individual score for the message sender, representing an individual probability that the message sender sent an unsolicited message;
   computing the reputation score for the message sender from the individual scores for the message sender from each list of the two or more lists indicating the message sender; wherein the step of computing the reputation score comprises determining an aggregate score based on the individual score for each list of the two or more lists by performing at least one of a Chi Squared calculation, a Robinson calculation and a Bayes calculation on the individual scores for the message sender; and
  when the reputation score is worse than a first predefined threshold, performing a specified action associated with responding to the unsolicited message.

96. The apparatus of claim 95, wherein the step of performing the specified action comprises indicating that the message is unsolicited.

97. The apparatus of claim 95, wherein the step of performing the specified action comprises deleting the message.

98. The apparatus of claim 95, wherein the step of performing the specified action comprises moving the message into a trash message folder.

99. The apparatus of claim 95, wherein the step of performing the specified action comprises moving the message into a bulk mail message folder.

100. The apparatus of claim 95, wherein the step of performing the specified action comprises associating the message with a first flag, wherein the first flag indicates that the message is estimated to be unsolicited.

101. The apparatus of claim 95, further comprising one or more stored sequences of instructions which, when executed by the one or more processors, cause the one or more processors to carry out the step of:
when the reputation score is better than a second predefined threshold, performing a second specified action associated with responding to messages that are not unsolicited, wherein the first predefined threshold is different from the second predefined threshold.

102. The apparatus of claim 101, wherein the step of performing the second specified action comprises indicating that the message is valid.

103. The apparatus of claim 101, wherein the message is associated with a message recipient, and wherein the step of performing the second specified action comprises sending the message to the message recipient.

104. The apparatus of claim 101, wherein the step of performing the second specified action comprises performing one or more filter operations on the message.

105. The apparatus of claim 101, wherein the step of performing the second specified action comprises associating the message with a second flag, wherein the second flag indicates that the message is estimated to be valid.

106. The apparatus of claim 101, further comprising one or more stored sequences of instructions which, when executed by the one or more processors, cause the one or more processors to carry out the step of:
when the reputation score is better than the first predefined threshold and worse than the second predefined threshold, performing a third specified action.

107. The apparatus of claim 106, wherein the step of performing the third specified action comprises indicating that the message has a first quality, where the first quality indicates that the message is not estimated as valid and the message is not indicated as invalid.

108. The apparatus of claim 106, wherein the step of performing the third specified action comprises performing one or more filter operations on the message.

109. The apparatus of claim 106, wherein the message is associated with a message recipient, and wherein the step of performing the third specified action comprises sending the message to the message recipient.

110. The apparatus of claim 106, wherein the step of performing the third specified action comprises associating with the message a third flag, wherein the third flag indicates that the message is not estimated to be either valid or invalid.

111. The apparatus of claim 95, further comprising one or more stored sequences of instructions which, when executed by the one or more processors, cause the one or more processors to carry out the step of sending a request for the reputation score of the message sender to a service for determining the reputation of the message sender, and wherein the step of obtaining the reputation score of the message sender comprises receiving a response to the request for the reputation score of the message sender from the service for determining a reputation of the message sender.

112. The apparatus of claim 111, wherein the step of sending the request for the reputation score of the message sender comprises sending a DNS request and receiving the response to the request for the reputation score of the message sender comprises receiving a DNS response.

* * * * *